United States Patent
Vora et al.

(10) Patent No.: US 12,437,551 B2
(45) Date of Patent: Oct. 7, 2025

(54) INSTANCE SEGMENTATION IN A PSEUDO-IMAGE

(71) Applicant: Motional AD LLC, Boston, MA (US)

(72) Inventors: Sourabh Vora, Marina Del Rey, CA (US); Qi Chen, Baltimore, MD (US)

(73) Assignee: Motional AD LLC, Boston, MA (US)

( * ) Notice: Subject to any disclaimer, the term of this patent is extended or adjusted under 35 U.S.C. 154(b) by 456 days.

(21) Appl. No.: 17/657,590

(22) Filed: Mar. 31, 2022

(65) Prior Publication Data

US 2023/0298356 A1 Sep. 21, 2023

Related U.S. Application Data

(60) Provisional application No. 63/269,601, filed on Mar. 18, 2022.

(51) Int. Cl.
*G06V 20/58* (2022.01)
*G06V 10/26* (2022.01)
*G06V 10/764* (2022.01)
*G06V 10/82* (2022.01)

(52) U.S. Cl.
CPC ............ *G06V 20/58* (2022.01); *G06V 10/267* (2022.01); *G06V 10/764* (2022.01); *G06V 10/82* (2022.01); *G06V 2201/08* (2022.01)

(58) Field of Classification Search
CPC .... G06V 20/58; G06V 10/267; G06V 10/764; G06V 10/82; G06V 2201/08
See application file for complete search history.

(56) References Cited

U.S. PATENT DOCUMENTS

| 2020/0150235 A1* | 5/2020 | Beijbom | G01S 7/4808 |
| 2022/0371606 A1 | 11/2022 | Vora et al. | |
| 2022/0383640 A1 | 12/2022 | Vora et al. | |

OTHER PUBLICATIONS

Peng, K. et al., "MASS: Multi-Attentional Semantic Segmentation of LiDAR Data for Dense Top-View Understanding", Cornell University Library, Jul. 2021, in 14 pages. URL: https://arxiv.org/abs/2107.00346v1 (Year: 2021).*

A. Ojha, S. P. Sahu and D. K. Dewangan, "Vehicle Detection through Instance Segmentation using Mask R-CNN for Intelligent Vehicle System," 2021 5th International Conference on Intelligent Computing and Control Systems (ICICCS), Madurai, India, 2021, pp. 954-959, doi: 10.1109/ICICCS51141.2021.9432374. (Year: 2021).*

U.S. Appl. No. 63/379,671, filed Oct. 14, 2022, Chen et al.

(Continued)

*Primary Examiner* — Matthew C Bella
*Assistant Examiner* — Jinsu Hwang
(74) *Attorney, Agent, or Firm* — Knobbe, Martens, Olson & Bear, LLP

(57) ABSTRACT

A system is configured to segment instances of objects in a pseudo-image. The pseudo-image can be generated from a 3D image coupled to a vehicle. The system can receive the pseudo-image, which can include multiple sections. The system can determine an object classification for a section and determine an instance portion classification for the section. The system can group the section with another section based on the object classification and the instance portion classification. The grouping can correspond to an instance of an object in the image. The system can use the grouping to navigate the vehicle.

18 Claims, 14 Drawing Sheets

(56) References Cited

OTHER PUBLICATIONS

International Search Report and Written Opinion received for PCT Patent Application No. PCT/US2023/064287, mailed on May 24, 2023.

Peng, K. et al., "MASS: Multi-Attentional Semantic Segmentation of LIDAR Data for Dense Top-View Understanding", Cornell University Library, Jul. 2021, in 14 pages. URL: https://arxiv.org/abs/2107.00346v1.

Ahn, J. et al., "Learning pixel-level semantic affinity with image-level supervision for weakly supervised semantic segmentation", Proceedings of the IEEE Conference on Computer Vision and Pattern Recognition, 2018, pp. 4981-4990.

Berman, M. et al., "The lovász-softmax loss: A tractable surrogate for the optimization of the intersection-over-union measure in neural networks", Proceedings of the IEEE Conference on Computer Vision and Pattern Recognition, Apr. 2018, in 14 pages.

Bertasius, G. et al., "Convolutional random walk networks for semantic image segmentation", Proceedings of the IEEE Conference on Computer Vision and Pattern Recognition, 2017, pp. 858-866.

Chen, Q. et al., "PolarStream: Streaming object detection and segmentation with polar pillars", 35th Conference on Neural Information Processing Systems, 2021, in 19 pages.

Cheng, Y. et al., "Locality-Sensitive Deconvolution Networks with Gated Fusion for RGB-D Indoor Semantic Segmentation", Proceedings of the IEEE Conference on Computer Vision and Pattern Recognition, Jul. 2017, pp. 3029-3037.

Fong, W. et al., "Panoptic nuScenes: A Large-Scale Benchmark for LiDAR Panoptic Segmentation and Tracking", Dec. 2021, arXiv preprint arXiv:2109.03805, in 15 pages.

He, K. et al., "Mask R-CNN", Proceedings of the IEEE International Conference on Computer Vision, Jan. 2018, in 12 pages.

Kirillov, A. et al., "Panoptic feature pyramid networks", Proceedings of the IEEE/CVF Conference on Computer Vision and Pattern Recognition (CVPR), Jun. 2019, pp. 6399-6408.

Lang, A. et al., "PointPillars: Fast Encoders for Object Detection from Point Clouds", CVPR 2019, May 2019, arXiv:1812.05784v2, in 9 pages.

Lin, T. et al., "Feature pyramid networks for object detection", Proceedings of the IEEE Conference on Computer Vision and Pattern Recognition, Apr. 2017, in 10 pages.

Loshchilov, I. et al., "Fixing Weight Decay Regularization in Adam", ICLR 2018 Conference Blind Submission, Feb. 2018, in 14 pages (paper originally submitted under double-blind review).

Ronneberger, O. et al., "U-Net: Convolutional Networks for Biomedical Image Segmentation", International Conference on Medical Image Computing and Computer-Assisted Intervention, Oct. 2015, pp. 234-241.

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

Sirohi, K. et al., "EfficientLPS: Efficient LiDAR Panoptic Segmentation", IEEE Transactions on Robotics, Nov. 2021, arXiv:2102.08009v3, in 20 pages.

Smith, L., "A Disciplined Approach to Neural Network Hyper-Parameters: Part 1-Learning Rate, Batch Size, Momentum, and Weight Decay", US Naval Research Laboratory Technical Report 5510-026, Apr. 2018, arXiv preprint arXiv:1803.09820, in 21 pages.

Wang, H. et al., "Axial-DeepLab: Standalone Axial-Attention for Panoptic Segmentation", European Conference on Computer Vision, 2020, in 26 pages.

Xiong, Y. et al., "UPSnet: A Unified Panoptic Segmentation Network", Proceedings of the IEEE/CVF Conference on Computer Vision and Pattern Recognition, Apr. 2019, in 15 pages.

International Preliminary Report on Patentability received for PCT Patent Application No. PCT/US2023/064287, mailed on Oct. 3, 2024.

\* cited by examiner

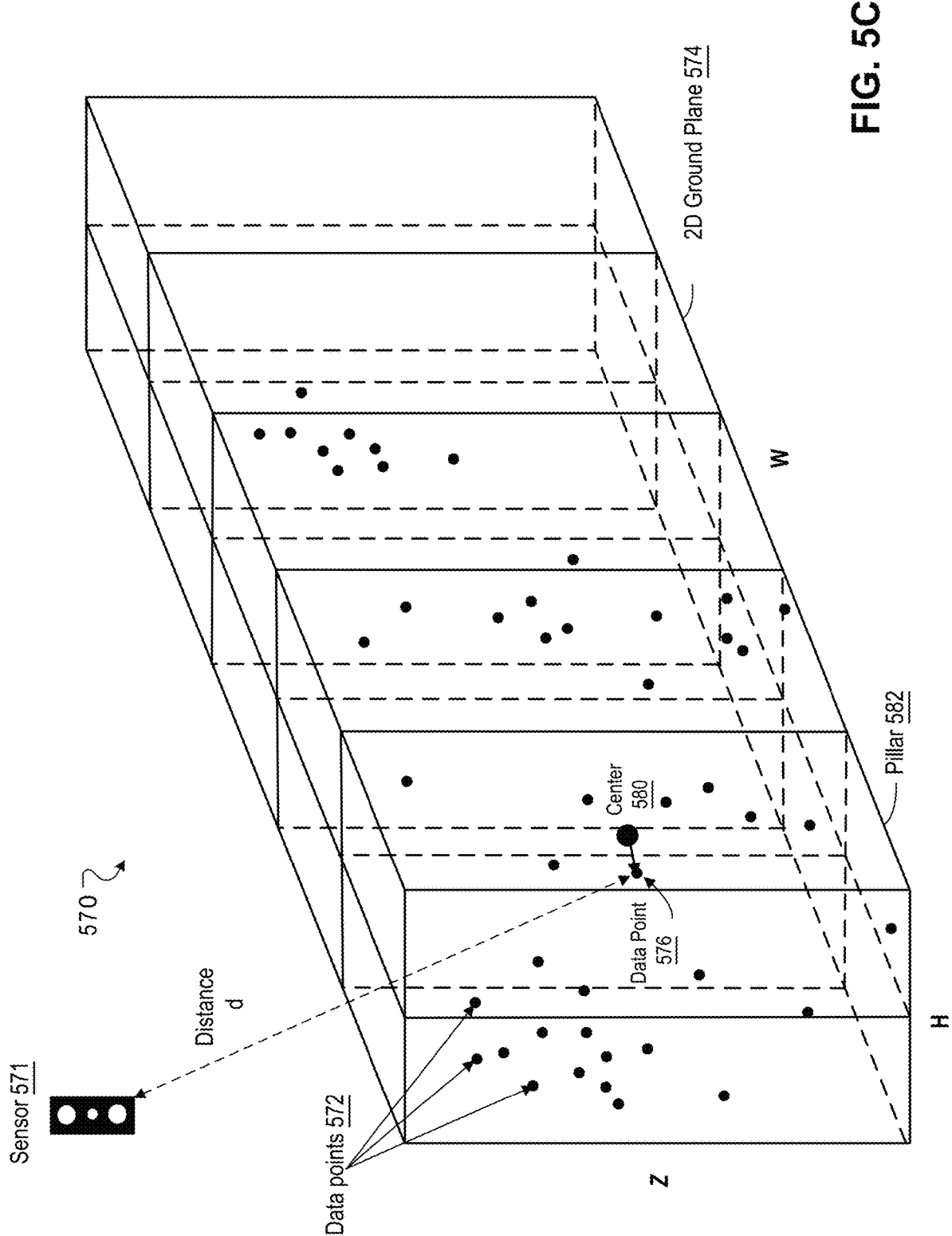

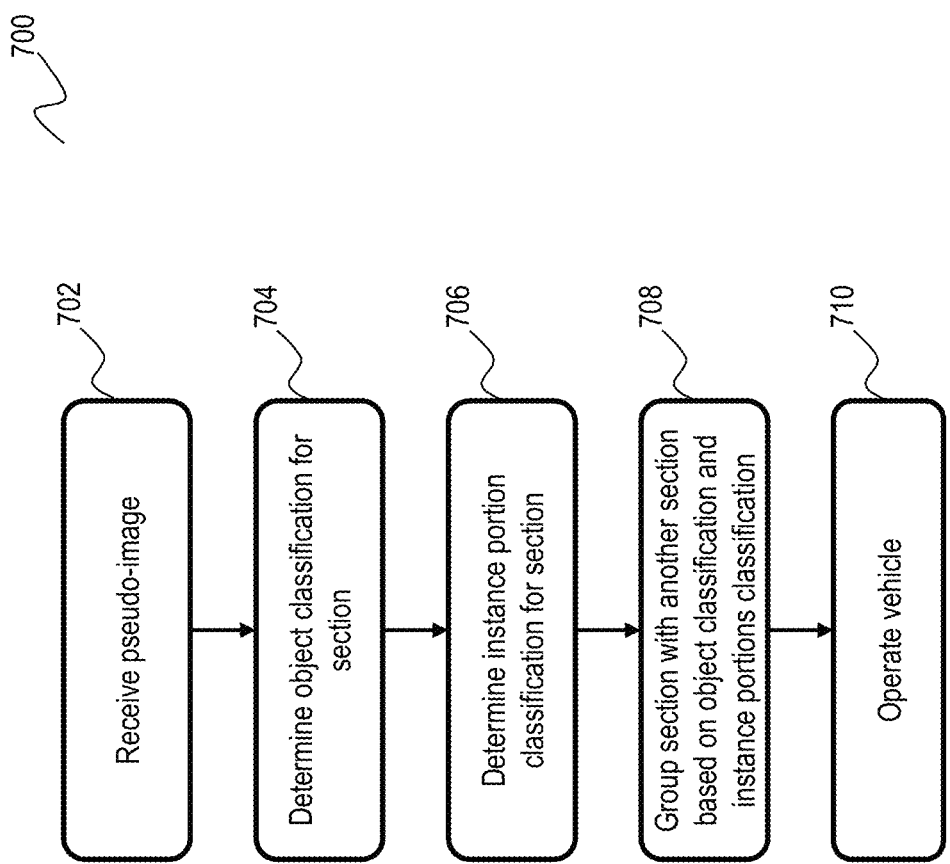

INSTANCE SEGMENTATION IN A PSEUDO-IMAGE

CROSS-REFERENCE TO RELATED APPLICATIONS

The present application claims priority to U.S. Prov. Pat. App. No. 63/269,601, filed on Mar. 18, 2022 entitled "PROPOSAL-FREE LIDAR PANOPTIC SEGMENTATION WITH PILLAR-LEVEL AFFINITY," which is herein incorporated by reference in its entirety.

BACKGROUND

Autonomous vehicles driving in complex environments pose a significant technological challenge.

BRIEF DESCRIPTION OF THE FIGURES

FIG. 5C is a block diagram illustrating an example of a point cloud and pillars.

FIG. 7 is a flow diagram illustrating an example of a routine implemented by one or more processors to segment instances of objects.

DETAILED DESCRIPTION

Figure 1:
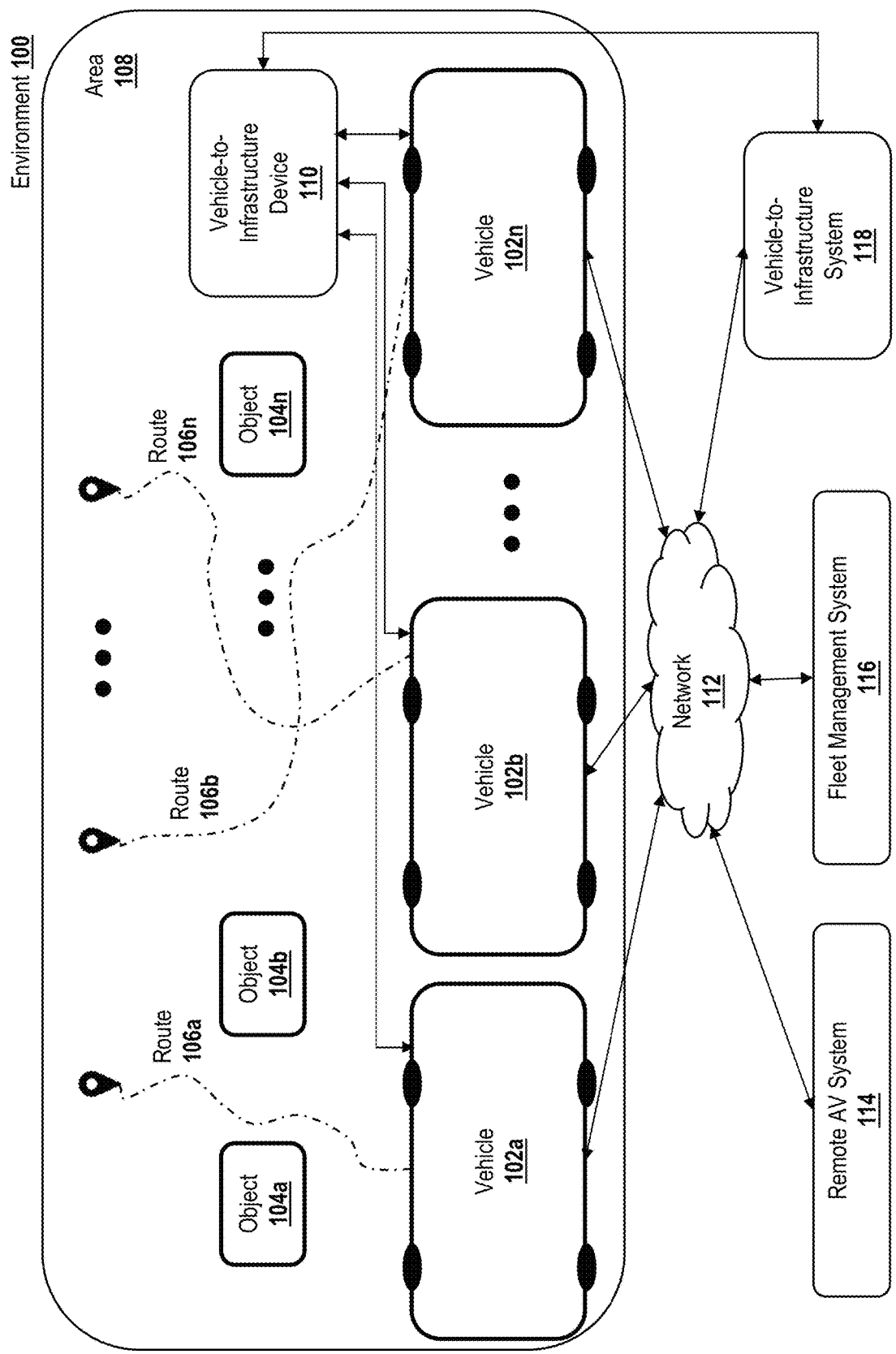
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a system configured to segment instances of objects. In some cases, the system can classify different sections of an image based on an object in the section and/or a portion of an object in the section. The classifications of the section can be used to group the section with other sections to provide object instances.

By virtue of the implementation of systems, methods, and computer program products described herein, autonomous vehicles can be improved. For example, the vehicle can more quickly identify objects instances using fewer compute resources. Given compute resource constraints of autonomous vehicles this can represent a significant advancement over previous systems. Moreover, by identifying objects instance more quickly using fewer compute resources, the system can enable the autonomous vehicle to more quickly perceive its surroundings and determine a path through those surroundings.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
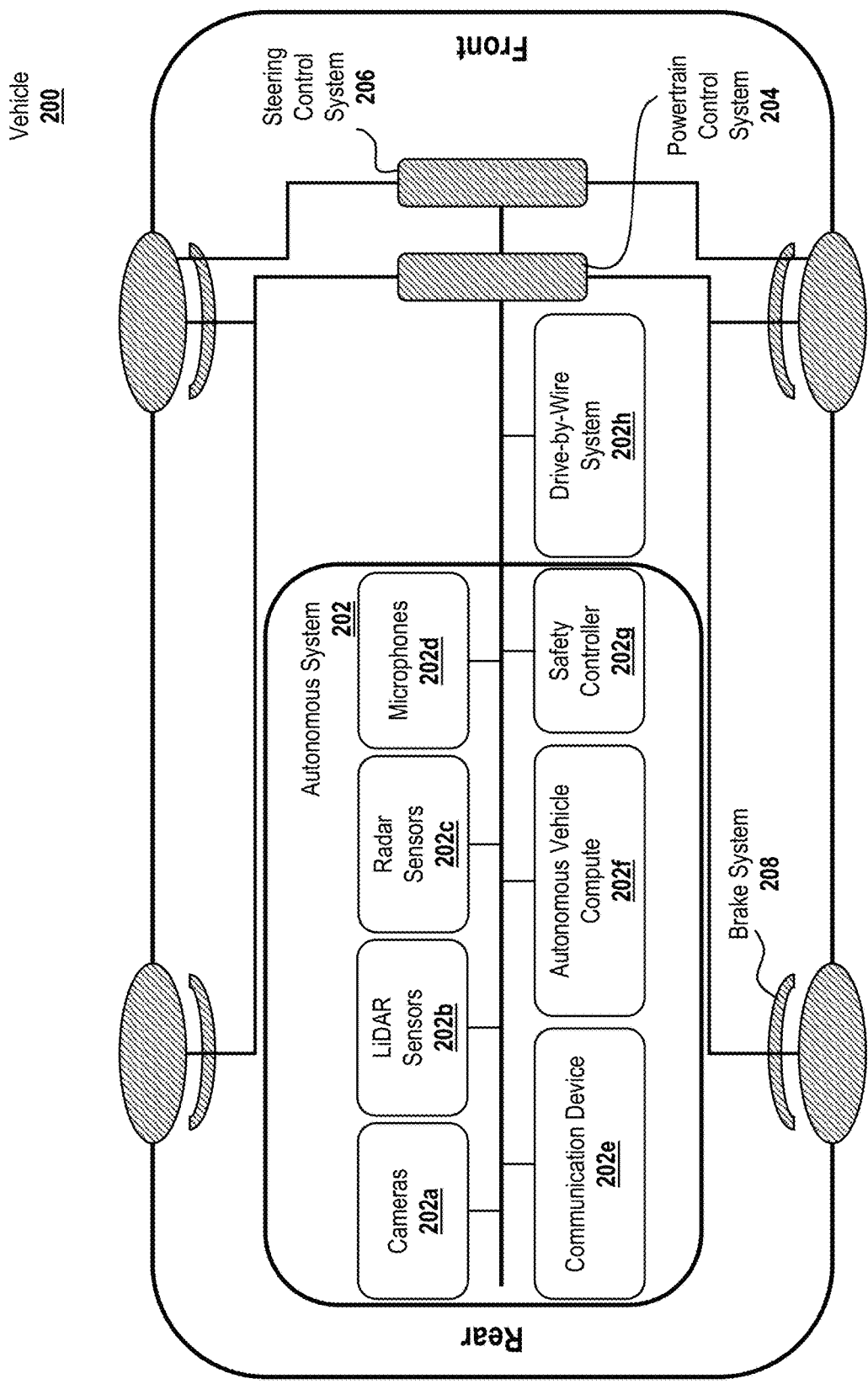
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, lidar sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
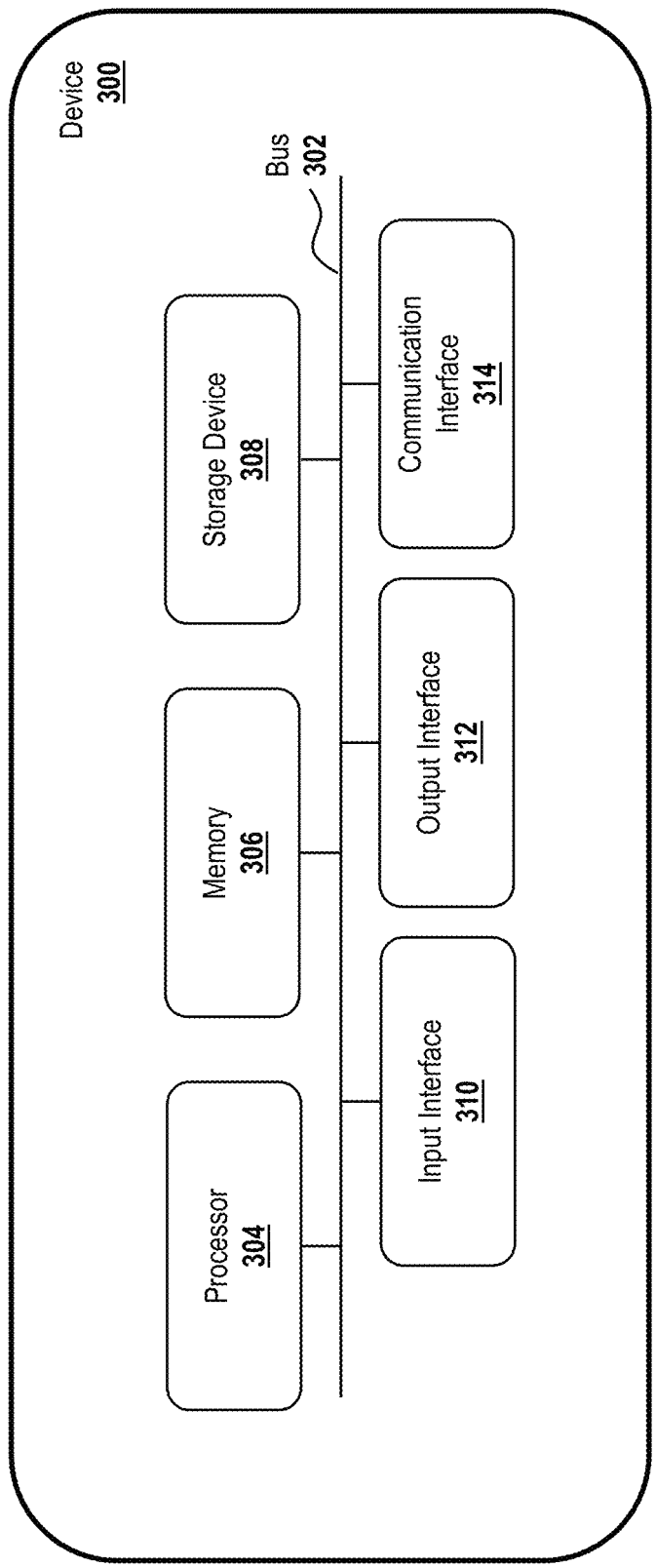
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (lidar) sensors 202b include at least one device configured to be in communication with communication device 202e, autonomous vehicle compute 202f, and/or safety controller 202g via a bus (e.g., a bus that is the same as or similar to bus 302 of FIG. 3). lidar sensors 202b include a system configured to transmit light from a light emitter (e.g., a laser transmitter). Light emitted by lidar sensors 202b include light (e.g., infrared light and/or the like) that is outside of the visible spectrum. In some embodiments, during operation, light emitted by lidar sensors 202b encounters a physical object (e.g., a vehicle) and is reflected back to lidar sensors 202b. In some embodiments, the light emitted by lidar sensors 202b does not penetrate the physical objects that the light encounters. lidar sensors 202b also include at least one light detector which detects the light that was emitted from the light emitter after the light encounters a physical object. In some embodiments, at least one data processing system associated with lidar sensors 202b generates an image (e.g., a point cloud, a combined point cloud, and/or the like) representing the objects included in a field of view of lidar sensors 202b. In some examples, the at least one data processing system associated with lidar sensor 202b generates an image that represents the boundaries of a physical object, the surfaces (e.g., the topology of the surfaces) of the physical object, and/or the like. In such an example, the image is used to determine the boundaries of physical objects in the field of view of lidar sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, lidar sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, lidar sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, lidar sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), vehicle 200, and/or one or more devices of network 112 (e.g., one or more devices of a system of network 112). In some embodiments, one or more devices of vehicles 102 (e.g., one or more devices of a system of vehicles 102), vehicle 200, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives lidar data associated with at least one point cloud generated by at least one lidar sensor (e.g., lidar sensors 202b). In certain examples, localization system 406 receives data associated with at least one point cloud from multiple lidar sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one lidar sensor (e.g., a lidar sensor that is the same as or similar to lidar sensors 202b) to generate data associated with an image representing the objects included in a field of view of the at least one lidar sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4A:
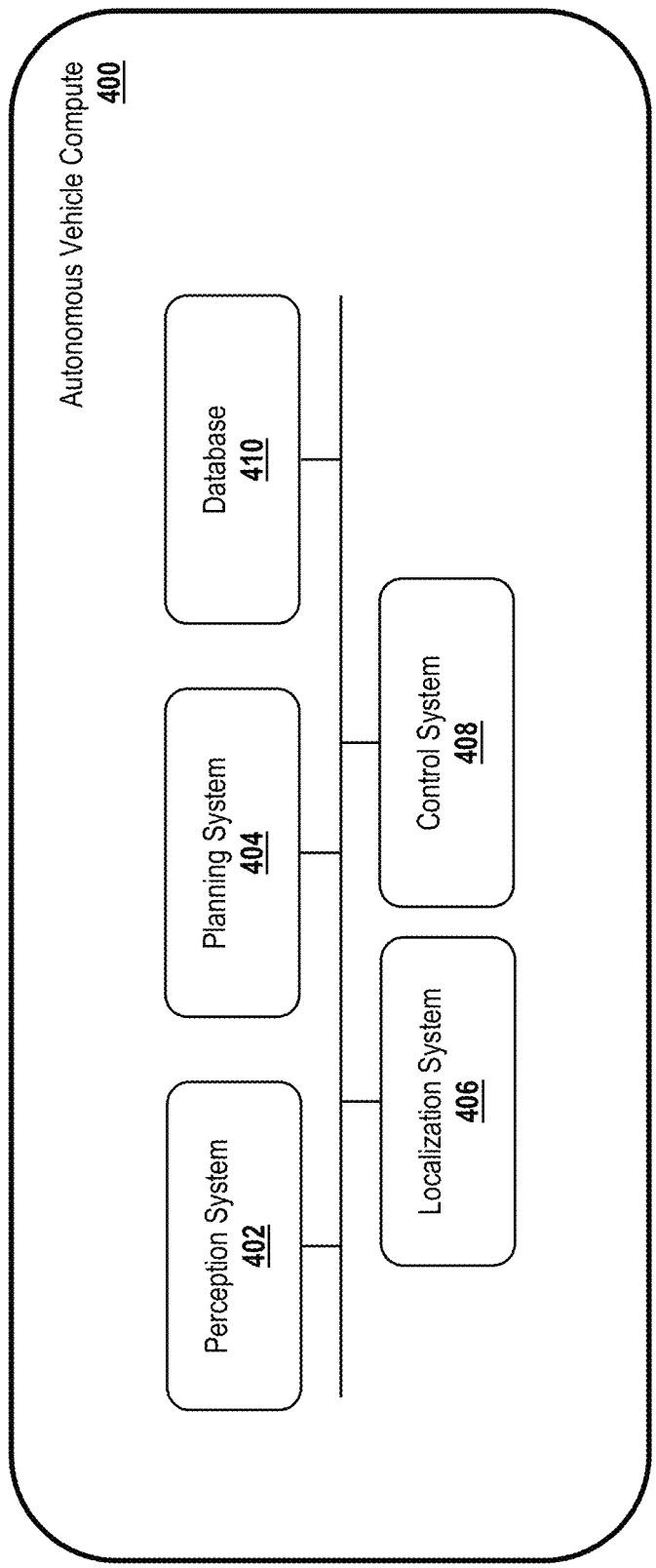
FIG. 4A is a diagram of certain components of an autonomous system.
Figure 4B:
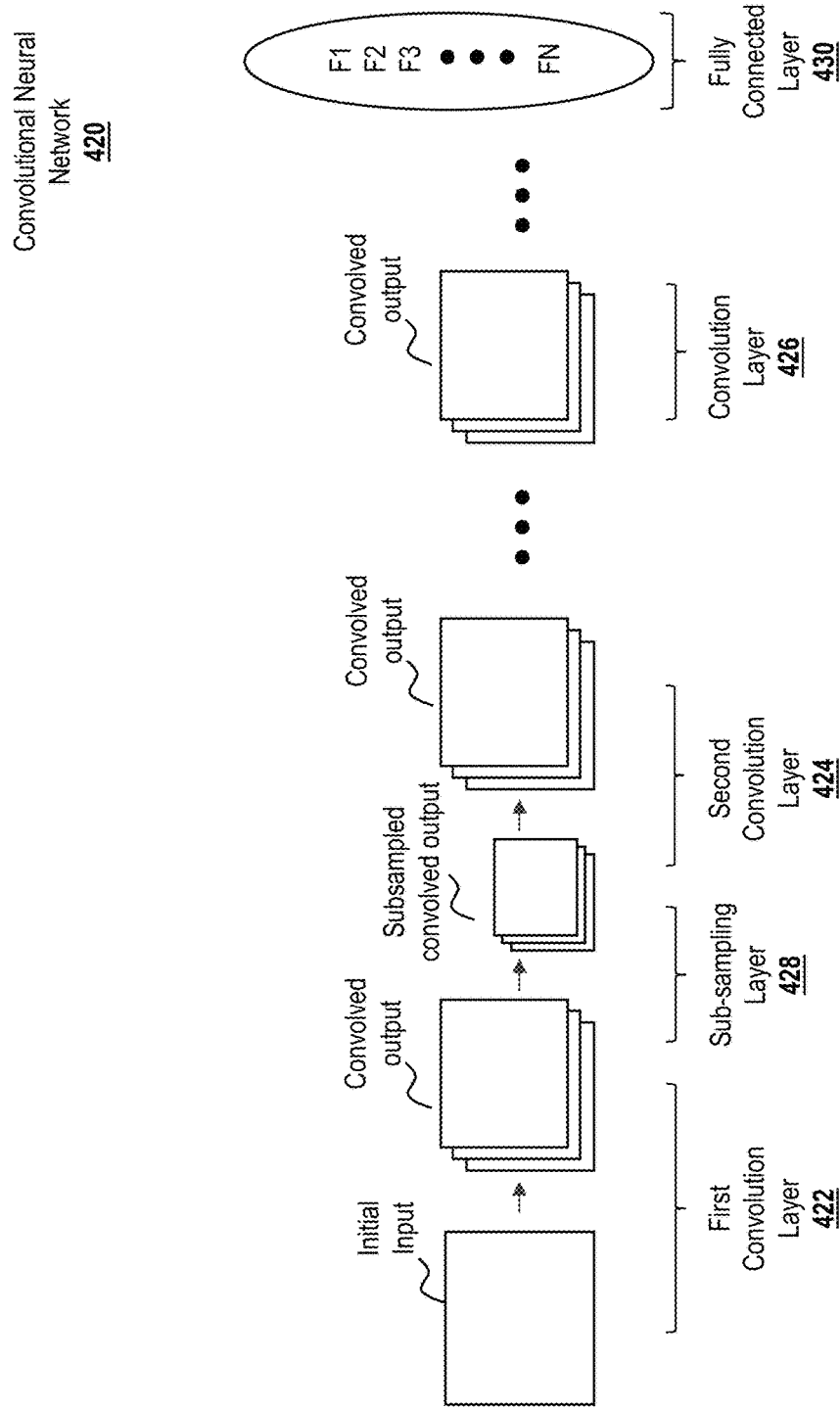
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, lidar data, radar data, and/or the like).

In some embodiments, CNN 420 generates an output based on perception system 420 performing convolution operations associated with each convolution layer. In some examples, CNN 420 generates an output based on perception system 420 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 420 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
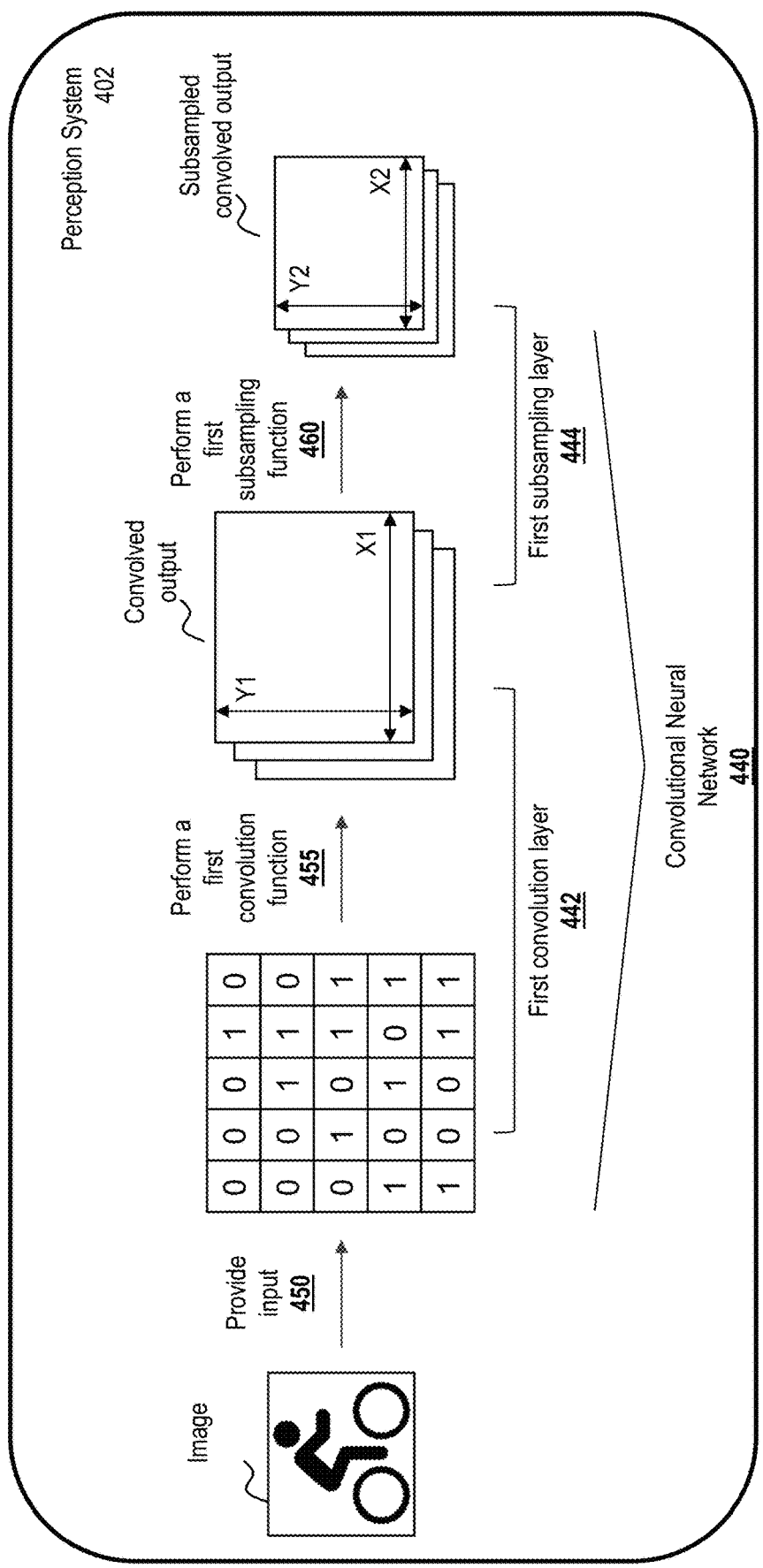
FIGS. 4C and 4D are a diagram illustrating example operation of a CNN.
Figure 4D:
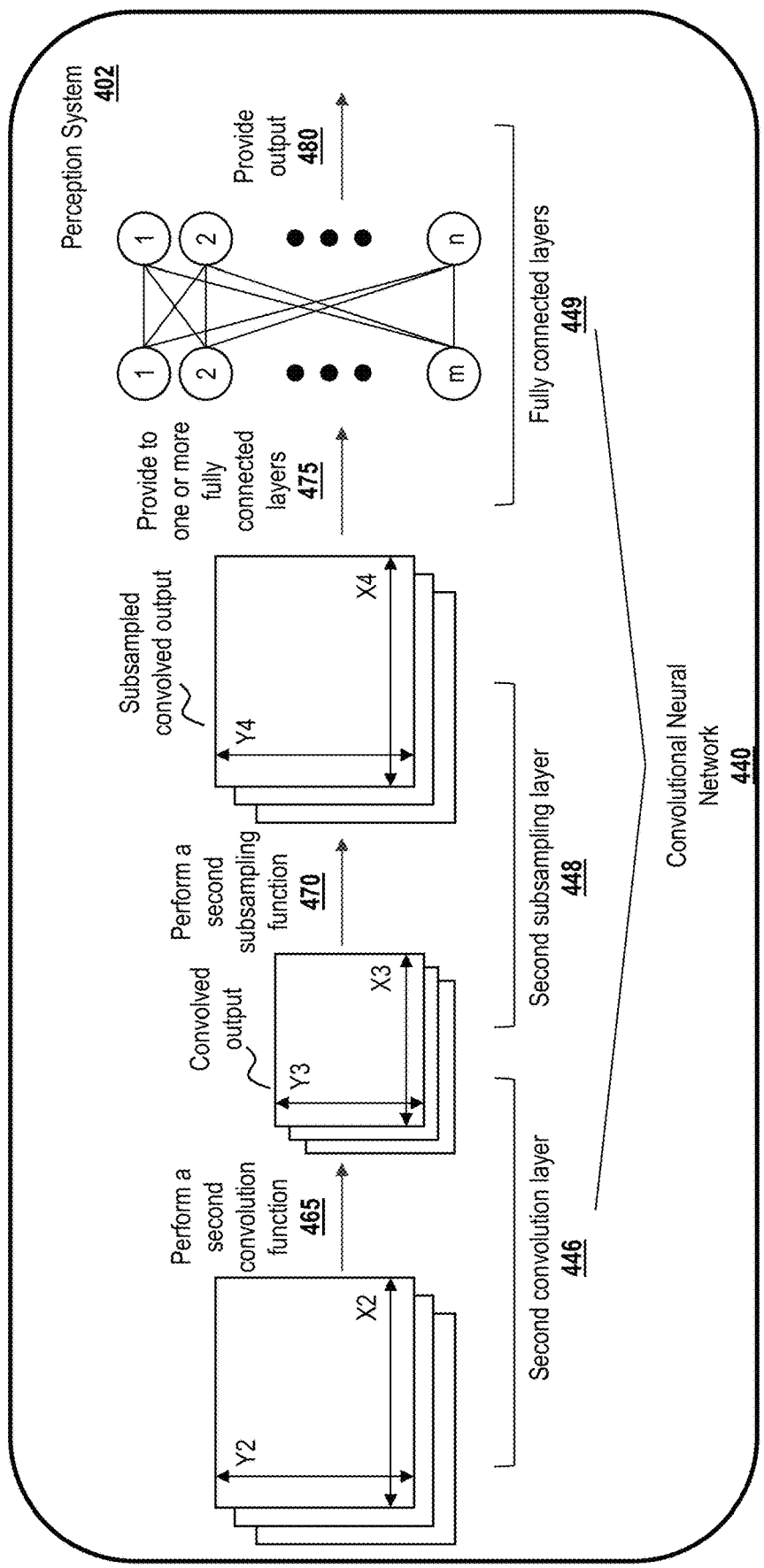

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output 480 of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

General Overview

Autonomous vehicles driving in complex environments (e.g., an urban environment) pose a significant technological challenge. To navigate these environments, the vehicles detect various types of objects such as vehicles, pedestrians, and bicycles in real-time using sensors such as lidar, radar, camera, or ultrasonic sensors.

One approach for performing object detection on image inputs is deep learning. However, the sparsity of sensor data (e.g., lidar point clouds) makes existing image-based deep learning techniques computationally inefficient. The disclosed embodiments include a system and techniques for efficiently and quickly detecting objects based on 3D sensor data.

Identifying objects using 3D sensor data can, in some cases, include transforming a 3D image into a 2D pseudo-image and performing semantic segmentation and instance portion segmentation on the 2D pseudo-image. Semantic segmentation can include labeling portions of an image (e.g., pixels, data points, or sections of a pseudo-image) and the and the classification of different objects in an image. These objects may include objects that move or act in some way, such as but not limited to a bicycle, bus, car, construction vehicle, motorcycle, pedestrian, trailer, truck, stroller, or other vehicle (also referred to herein as "agents" or "agent objects"), as well as stationary, non-acting, or background objects (also referred to herein as "non-agents" or "non-agent objects"), such as but not limited to a barrier, traffic cone, drivable surface, other flat surface, sidewalk, terrain, manmade structure, vegetation, etc. Instance portion segmentation can include the classification of different sections (non-limiting example: pillars of a point pillar image) of an image or portions of instances of objects. In some cases, instance portion segmentation can classify sections of an image that include agent objects. The combination of semantic segmentation and instance portion segmentation can be used to identify instances of different types of objects in an image (e.g., vehicle 1, vehicle 2, vehicle 3, pedestrian 1, pedestrian 2, bicycle 1, etc.), and can enable the vehicle to plan a route through a scene.

Classifying objects (e.g., semantic segmentation) and portions of instances (e.g., instance portion segmentation) can present a significant technological challenge. For example, there may be conflicts between object classifications and instances, inefficiencies may arise as the two tasks share redundant information, and overlapping identifiers (e.g., boxes) can result in an overidentification of objects. Moreover, identifying instances of agent objects using 3D sensor data can be complex and use significant computational resources, the use of which may take more time than is feasible for a vehicle to perceive its environment and determine a route through the environment.

The disclosed embodiments include a system and techniques for efficiently detecting instances of objects (and/or agents) from 3D sensor data. In some cases, the system can generate a pseudo-image from 3D sensor data and concurrently classify portions of instances of agent objects (instance portion segmentation) and classify objects (e.g., semantic segmentation) from the pseudo-image.

Using the instance portions classifications and object classifications, the system can traverse the pseudo-image and group different sections of the pseudo-image with different agent instances. For example, the system can determine whether individual sections of the pseudo-image correspond to an existing agent instance or a new (or unidentified) agent instance. In certain cases, as the system traverses the pseudo-image and encounters a section of the pseudo-image that is classified as an agent object, the system can determine whether the section shares an instance of an agent with other sections of the pseudo-image or is the beginning of an instance of an agent. For example, in cases where the image is a point pillar image, the system can scan pillars of the point pillar image from left to right and determine whether the pillar being scanned is the beginning of an instance or is part of an instance with pillars to its left.

By classifying instance portions as and performing semantic segmentation on a pseudo-image, the system can reduce the computational complexity of clustering instances of objects. For example, in some cases, the system can cluster instances without performing complex distribution calculations on data points in the pseudo-image. In this way, the system can reduce the load and computation demands of the processing system of the vehicle, thereby increasing the speed and accuracy of object detection by the vehicle in a vehicle scene.

Figure 5A:
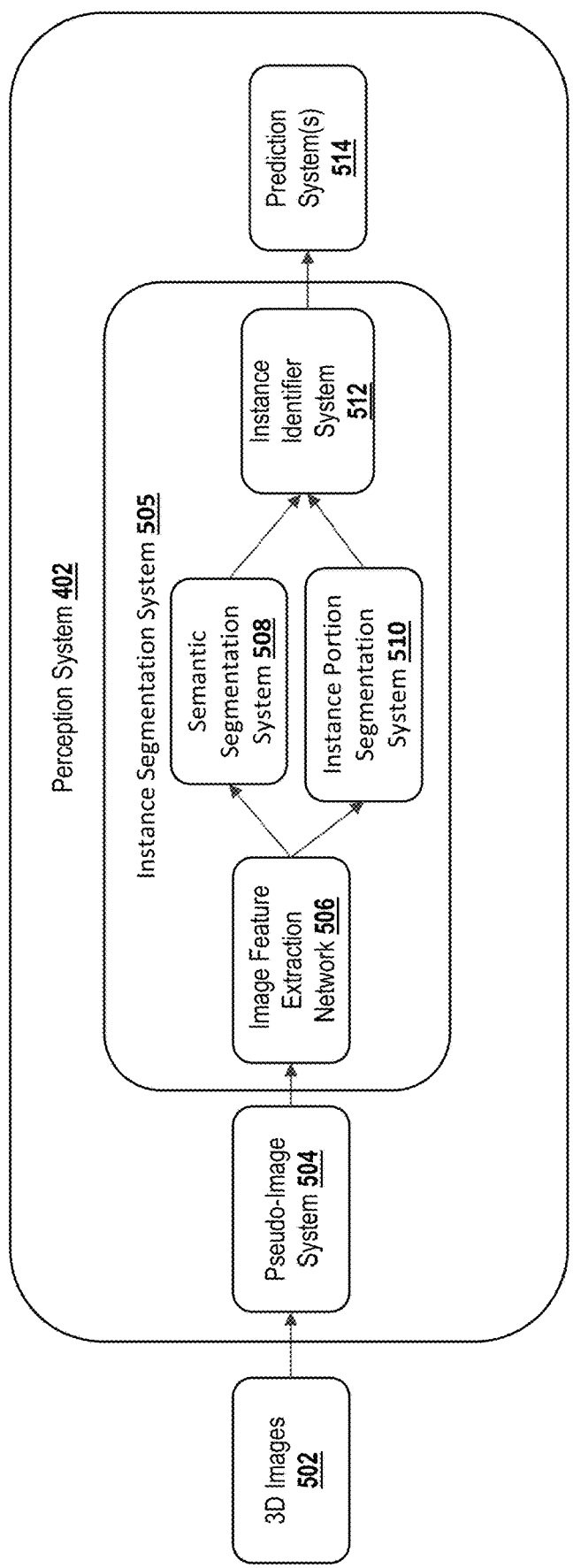
FIG. 5A is a block diagram illustrating an example of one or more components of a perception system.

FIG. 5A is a block diagram illustrating an example of one or more components of a perception system 402. In the illustrated example, the perception system 402 includes a pseudo-image system 504, an instance segmentation system 505, and one or more prediction system(s) 514. Moreover, in the illustrated example, the instance segmentation system 505 includes an image feature extraction network 506, a semantic segmentation system 508, an instance portion segmentation system 510, and an instance identifier system 512. In some cases, any one or any combination of the pseudo-image system 504, an image feature extraction network 506, a semantic segmentation system 508, an instance identifier system 510, and one or more prediction system(s) 514 can be implemented using one or more neural networks and/or one or more processors or computer hardware (e.g., by microprocessors, microcontrollers, application-specific integrated circuits [ASICs], Field Programmable Gate Arrays (FPGAs), and/or the like).

The pseudo-image system 504 can receive 3D images 502 (e.g., lidar, radar, etc.) and generate a pseudo-image. In some cases, the pseudo-image can be a pseudo-2D image. In certain cases, the pseudo-image can be a bird's eye view (BEV) image of a scene of the autonomous vehicle. In some cases, the pseudo-image system 504 can be implemented using one or more neural networks trained to receive 3D image data and output a pseudo-image.

The instance segmentation system 505 can receive the pseudo-image, extract features from the pseudo-image, segment objects in the pseudo-image, segment instance portions in the pseudo-image, and identify instances of objects in the pseudo-image. In the illustrated example, the instance segmentation system is implemented using an image feature extraction network 506, semantic segmentation system 508, instance portion segmentation system 510, and instance identify system 512, however, it will be understood that fewer or more components can be included in the instance segmentation system 505 and/or one or more of the components can be combined.

The prediction system(s) 514 can use the output from the instance identifier system 512 to determine one or more predictions for the instances identified by the instance identifier system 512. In some cases, the prediction system(s) 514 can be implemented using one or more CNNs that are the same as, or similar to, CNN 420 and/or CNN 440 and can be configured to receive instance identifier and pseudo-image data and output feature data associated with one or more features extracted from the pseudo-image and/or output an annotated image that includes the image data and feature data associated with the one or more features extracted from the received data. In some cases, the prediction system(s) 514 can be configured to determine width, height, and length of an object in an image, bounding boxes for an object, object movement, and/or object orientation. In certain cases, the prediction system(s) 514 is configured to determine features similar to a lidar neural network as well as an object trajectory prediction.

Pseudo-Image System

Figure 5B:
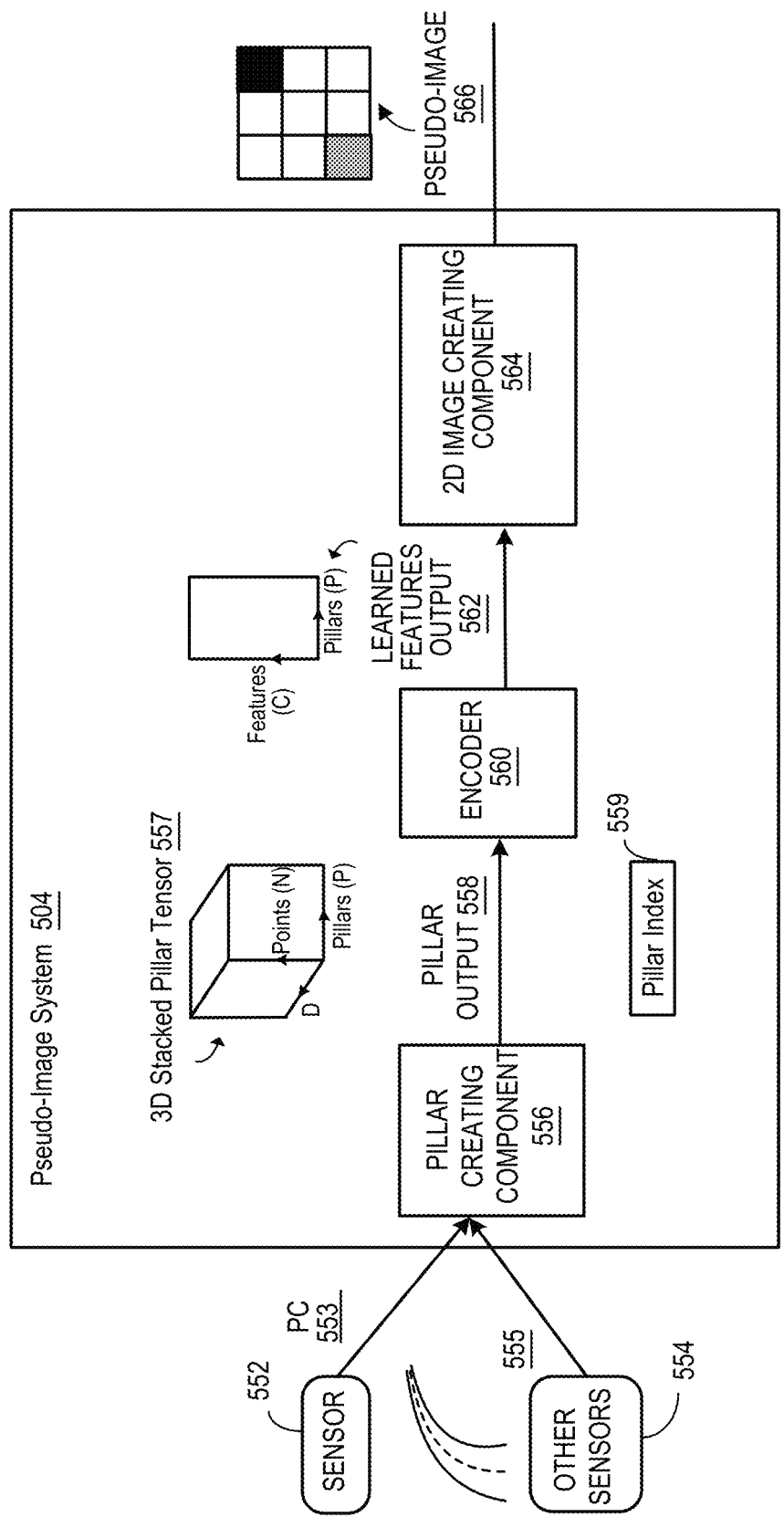
FIG. 5B is a block diagram illustrating an example of a pseudo-image system.

With reference to FIG. 5B, example components of a pseudo-image system 504 are shown. In the illustrated example, the pseudo-image system 504 includes a pillar creating component 556, an encoder 560, and a 2D image creating component 564. The pillar creating component 556 is configured to receive as input a set of measurements, for example, a point cloud 553, from a sensor 552 of the vehicle. In some embodiments, the sensor 552 is a lidar, for example, the lidar as described above. In some embodiments, the sensor 552 is a radar, for example, the radar described above. In an embodiment, the pillar creating component 556 is configured to receive a merged point cloud that is generated by combining the point clouds from multiple lidars.

The point cloud 553 includes a plurality of data points that represent a plurality of objects in 3D space surrounding the vehicle. For example, the plurality of data points represents a plurality of objects including one or more of a vehicle (e.g., a car, a bike or a truck), a pedestrian, an animal, a static object (for example, vegetation, buildings, etc.), or infrastructure (e.g., traffic lights). Each data point of the plurality of data points is a set of 3D spatial coordinates, for example, (x, y, z) coordinates. An example point cloud with a plurality of data points is illustrated in FIG. 5C.

The pillar creating component 556 is configured to divide the 3D space into a plurality of pillars (also referred to herein as a section). Each pillar of the plurality of pillars is a slice of the 3D space and each pillar extends from a respective portion of the 2D ground plane (e.g., the x-y plane) of the 3D space. In an embodiment, the 3D spatial coordinates are defined relative to the lidar coordinate frame. The x-y plane runs parallel to the ground, while z is perpendicular to the ground. In an embodiment, a pillar extends indefinitely up and down (z direction) corresponding to area below the ground and towards the sky in the environment. For example, in case of use of ground penetrating radars or other sensors that scan subsurface features the pillars extend downwards below the surface. Similarly, if the sensors include lidars with large fields of view or other sensors that scan a large area above the ground. In an embodiment, a pillar has a fixed minimum height and a fixed maximum height that corresponds to the observed environment including the ground and the tallest objects of interest.

In some embodiments, the pillar creating component 556 divides the 2D ground plane into a 2D grid that has grid cells having the same size (e.g., square grid cells having sides of equal length), and therefore the pillars extending vertically (e.g., in the z-direction) in the 3D space from these 2D grid cells have the same volume. In an embodiment, the size of the grid cells is variable and can be determined based on the computational requirements. A coarser grid will be less accurate and require less computational resources. Similarly, a finer grid will lead to increased accuracy at the cost of increased computational resources. For example, consider a scene broken done into a 50 m×50 m 2D grid. If each pillar of the grid were 50 cm×50 cm, the 2D grid would have 10,000 pillars or sections. If each pillar were 20 cm×20 cm, the 2D grid would have 62,500 pillars or sections, which can lead to increased accuracy and use more computational resources than the 10,000 pillar grid. In some cases, the grid cells have sides of unequal length.

In some cases, the pillar creating component 556 divides the 2D ground plane into a 2D grid with different grid cell sizes. For example, the component 556 detects in the point cloud 553 a density of objects using additional input 555 from other sensors 554 (e.g., a camera). The component 556 can generate a 2D grid with different grid cell sizes so that there are more pillars located in a region of high object density, less pillars located in a region of low object density, and no pillars in a region of no objects.

In some embodiments, the pillar creating component 556 divides the 2D ground plane into a 2D polar grid as described in greater detail in U.S. Prov. App. No. 63/194,694, filed May 28, 2021, U.S. Prov. App. No. 63/191,887, filed May 21, 2021, and U.S. App. No. TBD, filed Mar. 31, 2022, entitled STREAMING OBJECT DETECTION AND SEGMENTATION WITH POLAR PILLARS, each of which is incorporated herein by reference in its entirety for all purposes. In certain cases, the 2D polar grid may have different grid cell sizes. For example, the component 556 detects in the point cloud 553 a density of objects using additional input 555 from other sensors 554 (e.g., a camera, lidar, radar, or ultrasonic sensor). The component 556 can generate a 2D polar grid in a polar coordinate system so that there are pillars with shapes that correspond to the lidar coordinate frame (e.g., the natural shape of point cloud data). Put another way, most cells in the 2D polar grid contain data and are not empty due to a lack of correspondence between a shape of the point cloud data and a shape of the grid. In some embodiments, a 2D polar grid includes more pillars located in a region of high object density, less pillars located in a region of low object density, and no pillars in a region of no objects. In some embodiments, a 2D polar grid includes a plurality of substantially wedge-shaped cells. In examples, the point cloud 553 is divided into a number (n) of sectors according to an azimuth. For example, for a 2D polar grid divided into 32 sections, each sector corresponds to an azimuth of 360/32°.

Next, the pillar creating component 556 assigns each data point of the plurality of data points to a pillar in the plurality of pillars. For example, each data point of the plurality of data points is assigned to a respective pillar based on the 2D coordinates of the data point. That is, if the 2D coordinates of a data point are within a particular portion of the 2D ground plane which a particular pillar extends from, the data point is assigned to that particular pillar.

After the data points are assigned to the pillars, the pillar creating component 556 determines whether a first count of a plurality of non-empty pillars (pillars that have at least one data point) exceeds a threshold value P.

If the first count of the plurality of non-empty pillars exceeds P, the pillar creating component 556 selects P non-empty pillars from the plurality of non-empty pillars. For example, the pillar creating component 556 randomly subsamples P non-empty pillars from the plurality of non-empty pillars.

If the first count of non-empty pillars is less than the first threshold value P, the pillar creating component 556 generates a second subset of empty pillars, such that a sum of the first count and a second count of the second subset of pillars is equal to P. The pillar creating component 556 then selects P non-empty pillars from the plurality of non-empty pillars and the second subset of pillars.

For each non-empty pillar of the P non-empty pillars, the pillar creating component 556 is configured to maintain a threshold number of data points in each non-empty pillar. To do this, the pillar creating component 556 first determines, for each non-empty pillar of the P non-empty pillars, whether a third count of data points assigned to the non-empty pillar exceeds a second threshold value N.

For each non-empty pillar of the P non-empty pillars, if the third count of the data points assigned to the non-empty pillar exceeds the second threshold value N, the pillar creating component 556 selects N data points to be maintained in the non-empty pillar. For example, the pillar creating component 556 randomly subsamples N data points from the data points assigned to the non-empty pillar. In an embodiment, N is usually determined to be high enough such that there is a near statistical certainty (>99%) that one or more points from each object are captured in the point pillars. In an embodiment, different algorithms are used to further reduce the risk of missing an object during the sampling of data points. If the third count of the data points in the non-empty pillar is less than N, the pillar creating component 556 assigns the non-empty pillar a plurality of zero coordinate data points, such that the sum of a fourth count of the plurality of zero coordinates and the third count equals N.

In some embodiments, the first threshold value P and the second threshold value N are predetermined values. In an embodiment, P and N are predetermined based on the distribution of data points such that a fraction of the data points is removed. In some embodiments, the first threshold value P and the second threshold value N are adaptive values. In particular, based on a density of the objects in the 3D space, the pillar creating component 556 can adjust P and/or N such that there are more pillars and/or more data points allowed in each pillar in the region of high object density, less pillars and/or less data points in each pillar in the region of low object density, and no pillars in the region of no objects.

For each non-empty pillar of the plurality of non-empty pillars, the pillar creating component 556 generates a plurality of modified data points based upon the plurality of data points in each non-empty pillar. In particular, for each non-empty pillar, the pillar creating component 556 generates, for each data point in the non-empty pillar, a respective modified data point based on a relative distance between the data point and a center of the non-empty pillar. The center of the pillar is chosen such that the coordinate systems of the modified data points and the neural network used in subsequent processing is aligned. In an embodiment, the pillar creating component 556 generates, for each data point in the non-empty pillar, a respective modified data point based on the relative distance between the data point and the center of the non-empty pillar, and further based on a cylindrical Euclidean distance from the sensor 552 to the data point. The pillar creating component 556 then transforms the plurality of data points in each non-empty pillar to the plurality of modified data points generated for that non-empty pillar. In an embodiment, for each non-empty pillar, the pillar creating component 556 generates, for each data point in the non-empty pillar, a respective modified data point based on a relative distance between the data point the center of gravity (mean location) of the points in the pillar.

For example, in an embodiment, each data point of the plurality data points is represented by 3D spatial coordinates (x, y, z), a reflectance (r), and a time stamp (t). The pillar creating component 556 transforms each data point (x, y, z, r, t) in a non-empty pillar to a respective modified data point ($x_{offset}$, $y_{offset}$, z, r, t, d), where $x_{offset}$ and $y_{offset}$ are measured based on a relative distance between the data point and the center of the non-empty pillar, z is the height of the data point in the non-empty pillar, t is a timestamp, and d is a distance metric such as, for example, the cylindrical Euclidean distance from the sensor 552 to the data point. Other distance metrics are also possible. Each modified data point has D dimensions, where D is equal to the number of dimensions of the modified data point. In this example embodiment, each modified data point has D=6 dimensions: $x_{offset}$, $y_{offset}$, z, r, t, and d.

In an embodiment, the pillar creating component 556 assigns a pillar index to each of the P non-empty pillars and a data point index to each of the modified data points in the P non-empty pillars. The pillar creating component 556 generates a P dimensional pillar index vector 559 that maps the pillar index of each pillar to a corresponding location (e.g., a corresponding grid cell) in the original 2D grid from which the pillar vertically extends. In some embodiments, the 2D grid is a 2D polar grid.

In an embodiment, the pillar creating component 556 generates, for all non-empty pillars and all modified data points, a 3D stacked pillar tensor 557, which is a (D, P, N) dimensional tensor having a modified data point coordinate, a pillar index coordinate, and a data point index coordinate. For each of the modified data points in the P non-empty pillars, the 3D stacked pillar tensor 557 maps a pillar index of the pillar that includes the modified data point and a data point index of the modified data point to the modified data point.

The pillar creating component 556 then generates a pillar output 558 that includes the 3D stacked pillar tensor 557 and the P dimensional pillar index vector 559.

In an embodiment, the encoder 560 is a neural network that is configured to receive the pillar output 558 and to process the 3D stacked pillar tensor 557 to generate a learned features output 562 that characterizes the features of the point cloud 553.

In particular, to generate the learned features output 562, the encoder 560 initializes a current 3D feature tensor using the 3D stacked pillar tensor 557, and iteratively performs the following steps K times, where K is a predetermined number:

1. Applying a 1×1 convolution across the modified data point index coordinate and the pillar index coordinate (i.e., across the (N, P) canvas) of the current 3D feature tensor to generate a first tensor T with size ($C^K$, N, P).
2. Applying an element-wise maximum operator across the modified data point index coordinate of the first tensor T to generate a max matrix M with size ($C^K$, P). In particular, the max matrix M is calculated across all modified data points in each pillar such that:

$$M_{c^K,p} = \max_n T_{c^K,n,p} \quad (1)$$

3. Determining whether the current iteration is the $K^{th}$ iteration.
   a) If the current iteration is the $K^{th}$ iteration, outputting the current max matrix M as the learned features output 562 of the encoder 560. The output 562 is a ($C^K$, P) tensor.
   b) If the current iteration is not the $K^{th}$ iteration, generating a second ($C^K$, N, P) tensor $T_{max}$ by repeating the max matrix M for N times along the second dimension (i.e., the modified data point index coordinate) of the first tensor T, where N is the threshold number of data points in each pillar.
4. Concatenating the second tensor $T_{max}$ with the first tensor T along the first dimension (i.e., the modified data point coordinate) to generate a third tensor T' with size ($2C^K$, N, P).
5. Setting the current 3D feature tensor as the third tensor T'.

After performing the K iterations, the encoder 560 obtains the learned features output 562, which is a (C, P) tensor that includes P feature vectors, each feature vector having size C.

The 2D image creating component 564 is configured to receive the learned features output 562 from the encoder 560 and to process the learned features output 562 to generate the pseudo-image 566. The pseudo-image 566 is a 2D image that has more channels (e.g., 32, 64, or 128 channels) than a standard RGB image with 3 channels.

In particular, the 2D image creating component 564 uses the P dimensional pillar index vector 559 to scatter the dense (C, P) tensor to a plurality of locations on the pseudo-image 566 as shown in FIG. 7. That is, for each feature vector of size C in the dense (C, P) tensor, the image creating component 564 looks up the 2D coordinates of the feature vector using the P dimensional pillar index vector 559, and places the feature vector into the pseudo-image 566 at the 2D coordinates. As a result, each location on the pseudo-image 566 corresponds to one of the pillars and represents features of the data points in the pillar.

By converting a sparse point cloud 553 into the dense pseudo-image 566 that is compatible with a standard 2D convolutional architecture, the perception system 402 can efficiently and quickly process the pseudo-image by taking advantage of the processing power and speed of convolutional neural networks (CNNs) and GPUs.

FIG. 5C illustrates an example point cloud and pillars. In some embodiments, the pillars are polar pillars. The point cloud 570 has a plurality of data points 572. In this embodiment, each data point is a 5-dimensional data point having a spatial location (x, y, z), reflectance (r), and time stamp (t). The time stamp allows multiple lidar or radar sweeps to accumulate data points as inputs for a single prediction/detection of the objects. Each of the data points is assigned into one of the B=H×W pillars. Each pillar is a z-column that extends from a portion of the 2D ground plane 574 in the z direction. As described above in reference to FIG. 5B, a pillar processing module is configured to transform each of the data points having an original presentation to a respective modified data point having a different presentation. For example, as shown in FIG. 5C, data point 576 in a non-empty pillar 582 has an original 5-dimensional representation including 3D spatial coordinates (x, y, z), a reflectance (r), and a time stamp (t). The pillar processing module transforms the data point 576, represented by (x, y, z, r, t), to a respective modified data point represented by ($x_{offset}$, $y_{offset}$, z, r, t, d), where $x_{offset}$ and $y_{offset}$ are measured based on a relative distance between the data point 576 and the center 580 of the non-empty pillar 582, where z is the height of the data point in the non-empty pillar, r is the reflectance, t is the timestamp, and d is the cylindrical Euclidean distance from a sensor 571 to the data point 576.

In an embodiment, the 2D ground plane 574 is divided into multiple grid cells having the same dimensions, and thus the plurality of pillars extending vertically (in the Z-direction) from these grid cells also have the same volume. However, in other embodiments, the 2D ground plane can be divided into multiple grid cells having different sizes as shown in FIG. 5D.

Figure 5D:
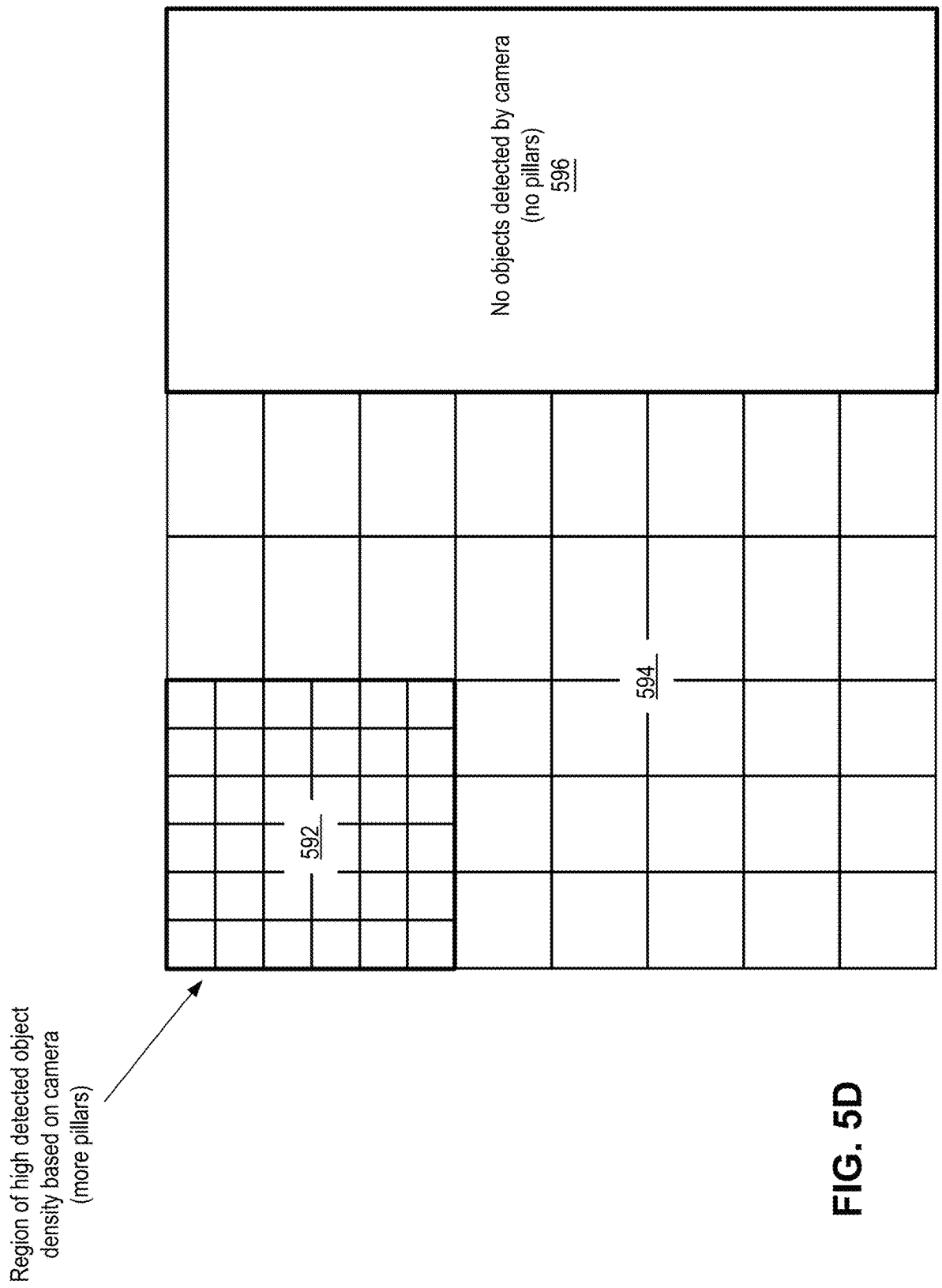
FIG. 5D illustrates an example of a 2D ground plane of a point cloud.

FIG. 5D illustrates an example 2D ground plane of a point cloud. The 2D ground plane is divided into multiple grid cells that have different cell sizes, depending on the density of objects in the 3D space.

As shown in FIG. 5D, region 592 has a high density of detected objects based on another sensor of the vehicle (e.g., a camera, radar, sonar). Therefore, region 592 has a smaller grid cell size, which means there are more pillars in the region 592 to capture more information about the objects in the region 592. In an embodiment, each pillar in the region 592 has more data points allowed in each pillar than other regions with lower object density. In contrast, region 596 does not have any objects detected by the camera. Thus, there is no pillar in the region 596. Region 594 has a moderate density of detected objects, therefore having more pillars than region 596 but less pillars than the region 592. Generally, the threshold value N is greater for pillars located in the region of high object density and smaller for pillars located in the region of low object density.

Instance Segmentation System

Returning to FIG. 5A and the components of the instance segmentation system 505, the image feature extraction network 506 can receive the pseudo-image and extract features therefrom. In some cases, the image feature extraction network 506 is configured to process the pseudo-image to generate an intermediate output that characterizes features of the pseudo-image. In some cases, the image feature extraction network 506 is a 2D CNN (e.g., similar to the CNN 420 of FIGS. 4A-4D) that includes one or more neural network layers. The one or more neural network layers may include one or more of (i) a 3×3 convolutional neural network layer, (ii) a Rectified Linear Unit (ReLU) neural network layer, and (ii) a batch normalization neural network layer. In an embodiment, the intermediate output is a feature map that has more channels than the pseudo-image 566. For example, if the pseudo-image has 32 channels an intermediate output can have 512 channels. As another example, if the pseudo-image 566 has 32 channels, an intermediate output can have 256 channels.

The semantic segmentation system 508 can use the output of the image feature extraction network 506 to label pixels and classify objects in the pseudo-image. In some cases, the semantic segmentation system 508 can be implemented as a CNN (e.g., similar to the CNN 420 of FIGS. 4A-4D). In certain cases, the semantic segmentation system 508 is implemented as a feed-forward convolutional neural network that, given the output from the semantic segmentation system 508, can generate classification scores for the presence of object classes (e.g., cars, pedestrians, or bikes) in the pseudo-image. In some cases, these labels can be associated (or embedded) with the pixels of the pseudo-image. The higher the classification score, the more likely the corresponding object class is present (or the more likely the respective pixel corresponds to an object of that class). In certain cases, the semantic segmentation system can perform a pillarwise K-class classification with output size H×W×K, which may be the same spatial size as input pillars. In certain cases, all points inside a particular pillar share the same predicted semantic class. In some cases, the semantic segmentation system 508 assigns an object classification to some or all of the sections of the pseudo-image. The object classifications can include but are not limited to agent object classifications (e.g., vehicle, pedestrian, bicycle, etc.) and non-agent object classifications (e.g., sidewalk, road, curb, etc.).

The instance portion segmentation system 510 can use the output of the image feature extraction network 506 to classify sections of the pseudo-image that correspond to different portions of instances of objects in the pseudo-image. For example, the instance portion segmentation system 510 can classify sections of the pseudo-image that correspond to the same instance of an agent (e.g., objects that can move and/or perform an action) as primary sections or secondary sections. In some cases, the instance portion segmentation system 510 can be implemented as a head of a neural network that has been trained to assign an instance portion classification (score) to sections of the pseudo-image that correspond to different portions of agents in the pseudo-image. The higher the classification score, the higher the confidence that the classification for the section is accurate.

In certain cases, ground truth data used to train a neural network associated with the instance portion segmentation system 510 can include labels identifying pseudo-image sections that correspond to different portions of instances of agents. In some cases, pseudo-image sections of the ground truth data that correspond to different portions of an agent instance can be labeled differently to enable the neural network associated with the instance portion segmentation system 510 to learn to discern between the different portions of agent instances.

In some cases, the ground truth data can include labels that identify a section that corresponds to a primary portion (non-limiting example: bottom, top, right, left-most portion of an agent) of an agent one way and sections that correspond to other (secondary) portions of the agent a different way. For example, at least one pseudo-image section corresponding to an agent can be labeled as a primary section of an instance and some or all other pseudo-image sections corresponding to the same agent instance can be labeled as secondary sections of the same agent instance.

In some such cases, the ground truth data may omit, or not include, labels for objects that do not move or act (also referred to as non-agents, e.g., sidewalk, streets, grass, curb, etc.) and/or labels for empty sections of the pseudo-image (whether or not the empty sections correspond to an agent). As such, the neural network associated with the instance portion segmentation system 510 can learn to classify portions of agent objects and ignore non-agent objects.

In certain cases, the instance portion segmentation system 510 can assign instance portion classifications (or scores) to pseudo-image sections that correspond to agents (and may ignore sections that correspond to non-agent objects and/or empty sections that correspond to agents or non-agents). In some cases, the instance portion segmentation system 510 can also indicate a probability or likelihood that the instance portion classification is correct.

In some cases, the instance portion segmentation system 510 ignores the sections that correspond to non-agent objects and/or empty sections based on the ground truth data used to train the neural network associate with the instance portion segmentation system 510. For example, if the ground truth data does not include labels for non-agent object and/or empty sections, the neural network may not learn to classify such sections.

The instance portion segmentation system 510 can assign an instance portion classification to pseudo-image sections based on the portion of an agent instance to which the section corresponds. In some cases, the instance portion segmentation system 510 can assign different instance portion classifications to sections of the pseudo-image that correspond to different portions of the agents. For example, the instance portion segmentation system 510 can assign one instance portion classification to a section that corresponds to a particular portion of an agent in the pseudo-image (e.g., a primary section of the instance and primary portion of the instance) and a different instance portion classification to a section that corresponds to a different portion of the same agent (e.g., a secondary section of the instance and secondary portion of the instance). In this way, the pseudo-image section corresponding to the primary portion of the agent can have a different instance portion classification than some or all other pseudo-image sections (e.g., secondary sections) that correspond to other (secondary) portions of the same agent.

It will be understood that the primary section of an instance can correspond to any portion of an agent as desired. In some cases, the primary section can correspond to the pseudo-image section that includes a point on a perimeter, edge, or corner of the agent. For example, the primary section can correspond to the pseudo-image section that includes a left edge or left-most point, right edge or right-most point; top edge or top-most point; bottom edge or bottom-most point; left-bottom edge, corner or point; right-bottom edge, corner or point; left-top edge, corner or point; right-top edge, corner or point; etc.; of the agent.

In certain cases, the instance portion segmentation system 510 can classify multiple sections as primary sections. As a non-limiting example, the instance portion segmentation system 510 can classify the pseudo-image sections that include to some or all of left-bottom corner, right-bottom corner, left-top corner, right-top corner of an agent, differently from section that include other portions of the agent.

In certain cases, the instance portion classification for the sections associated with an agent can be binary. In some cases, a first value in the binary format can indicate that a particular section of an agent is a primary section and corresponds to (or includes) a primary portion of an agent (e.g., left-most portion of the agent). A second value for the instance portion classification can indicate that a particular section is a secondary section and corresponds to (or includes) other (secondary) portions of the agent or does not correspond to (e.g., includes) the primary portion of the agent. As described herein, in some cases, the instance portion segmentation system 510 may not assign an instance portion classification to a section, which may indicate that the section corresponds to a non-agent object or is empty (e.g., has few to no data points in it).

In certain cases, the instance portion segmentation system 510 can use a holistic affinity vector to denote affinity between sections. In cases where the sections of the pseudo-image corresponds to pillars, the affinity between pillars $pl_i$ and $pl_j$ can be denoted as $a_{pli,plj}$, and the holistic affinity vector associated with pillar $pl_i$ can be $A=\{a_{pli,\ plj}\}$, $j=0, 1, \ldots, HW-1$. In cases, where the instance portion segmentation system 510 determines whether a pillar $pl_i$ shares the same instance as any of its previous pillars in a zig-zag traversal order, the target for $pl_i$ can be reduced as $a'_i=\max(\{a_{pli,\ plj}\}, j=0, 1, \ldots, i-1$, which can be a single value. The ground truth for $a'_i$ can be a binarized value. In certain cases, $a'_i=0$ can mean $pl_i$ is not similar to any of its previous pillars and $a'_i=1$ can mean $pl_i$ shares the same instance as at least one of its previous pillars. Also, depending on the direction of the traversal, $a'_i=0$ can indicate that $pl_i$ is the left-most pillar of a new (or unidentified) instance.

The instance identifier system 512 can use the output of the semantic segmentation system 508 and instance portion segmentation system 510 to cluster sections of the pseudo-image (and instance portions) and identify distinct instances of agents and/or objects within the pseudo-image (e.g., using the clustered sections). In some cases, the instance identifier system 512 can be implemented using one or more hardware processors, etc.

In some cases, the instance identifier system 512 can scan the pseudo-image in a predetermined pattern to identify agent instances. It will be understood that a variety of predetermined patterns can be used to scan the pseudo-image, such as but not limited to zig-zag (e.g., scan a column top-to-bottom, move to next column and scan that column top-to-bottom), back-and-forth (e.g., scan a column top-to-bottom, move to next column and scan that column bottom-to-top, and so on), etc. Similarly, various directions can be used, such as column-by-column (e.g., left-to-right, right-to-left) or row-by-row (e.g., bottom-to-top, top-to-bottom).

In some cases, the pattern and direction can correspond to the manner in which the primary section/primary portion of the instances was marked. For example, if the primary portion corresponds to a left most portion of instances, the instance identifier system 512 may use a zig-zag pattern, scanning columns left-to-right, where each column is scanned bottom-to-top before moving to the next column. As another example, if the primary portion corresponds to a bottom-most portion of instances, the instance identifier system 512 may use a zig-zag pattern, scanning rows bottom-to-top, where each row is scanned right-to-left before moving to the next row. Moreover, other patterns for traversing the pseudo-image can be used depending on the manner in which the portions of the instances are labeled and/or classified.

In some cases, as the instance identifier system 512 scans the sections of the pseudo-image, the instance identifier system 512 can ignore sections of the pseudo-image that were not classified by the instance identifier system 512 (e.g., empty sections and/or non-agent sections) and/or sections that were classified as non-agent objects by the semantic segmentation system 508.

As the instance identifier system 512 encounters sections classified by the instance portion segmentation system 510 (and/or sections classified as corresponding to agent objects), the instance identifier system 512 can determine whether the section corresponds to an existing instance or a new (or unidentified) instance.

In some cases, the instance identifier system 512 can use the instance portion classification assigned to the section by the instance portion segmentation system 510 to determine whether the section corresponds to an existing instance or a new (or unidentified) instance. In certain cases, if the instance portion classification assigned to the section identifies the section as a primary section, the instance identifier system 512 can determine that the section corresponds to a new (or unidentified) instance. Based on a determination that the section corresponds to a new (or unidentified) instance, the instance identifier system 512 can assign a unique instance identifier (e.g., an identifier that is different from all other existing instance identifiers in the pseudo-image) to the new (or unidentified) instance.

In some cases, if the instance portion classification assigned to the section identifies the section as a secondary section, the instance identifier system 512 can determine that the section corresponds to an existing instance. Based on the determination that the section corresponds to an existing instance, the instance identifier system 512 can identify an existing instance to associate with the section. In some cases, the instance identifier system 512 can identify an existing instance based on a distance from and/or object classification of other sections within the pseudo-image.

In certain cases, the instance identifier system 512 can identify an existing instance that has the same object classification as the (secondary) section. For example, different sections within a pseudo-image may correspond to instances of different types of agents or objects. Some of these agents or objects (and corresponding sections) may have a different object classification than the section under review. Accordingly, the instance identifier system 512 can ignore instances (and corresponding sections) with a different object classification and identify an existing instance (and corresponding sections) having the same object classification as the section under review for association with the section under review.

In some cases, the instance identifier system 512 can identify an existing instance that includes a section within a threshold distance of the section under review. For example, there may be multiple instances of agents or objects within a pseudo-image, however, some of the agents or objects may not be nearby (e.g., corresponding sections of those agents or objects do not satisfy a threshold distance relative to the section under review) and likely correspond to a different instance. Accordingly, the instance identifier system 512 can identify an existing instance that includes a section within the threshold distance of the section under review for association with the section under review.

In some cases, the distance threshold can correspond to a calculated difference between two sections (the section under review and a section already associated with an instance) and/or a number of rows/columns. For example, if the instance identifier system 512 is traversing left-to-right, bottom-to-top in a zig-zag pattern, the distance threshold may be four columns, such that a section corresponding to a first type of object (e.g., a vehicle) that is five columns away from a section that corresponds to the same type of object (e.g., a vehicle), will be identified as belonging to a different instance of that type of object (e.g., another vehicle). As another example, if the distance threshold is three sections, the instance identifier system 512 can determine whether two sections associated with the same type of agent are more than three sections away (taking into account rows and columns). It will be understood that other units can be used to calculate the distance, such as, mm, cm, m, etc.

In certain cases, in determining whether a distance threshold is satisfied, the instance identifier system 512 can take into account that opposite edges of a pseudo-image may correspond to adjacent locations in a scene. For example, if the pseudo-image corresponds to a 360-degree view of a scene, the left-most and right-most sections of the pseudo-image may correspond to locations in the scene that are adjacent. In such scenarios, the instance identifier system 512 can calculate the distance between sections as if the left-most sections and right-most sections of the pseudo-image were adjacent.

In certain cases, the threshold distance corresponds to the instance with a section that is closest to the section under review and that has the same object classification as the section under review. For example, there may be multiple instances of agents with the same object classification as the section that are near the section. Accordingly, in certain cases, the instance identifier system 512 can identify an existing instance (of the same object classification) that includes a section that is closest to the section for association with the section under review.

Once an existing instance is identified for association, the instance identifier system 512 can associate the section under review with the identified instance and with other sections that correspond to that instance. In certain cases, the instance identifier system 512 can associate the section with the existing instance by assigning, to the section, an instance identifier that is the same as the instance identifier for the existing instance (e.g., the same instance identifier assigned to other sections associated with the instance). In this way, the section under review can be assigned the same instance identifier as the existing instance.

In some cases, by separating semantic segmentation and classifying different portions of instances, the perception system 402 can reduce the computational demands of the instance identifier system 512. For example, by classifying the primary portion of an instance (non-limiting a portion at an edge or corner of the instance) differently from secondary portions of an instance, the perception system 402 can reduce the complexity of identifying instances by the instance identifier system 512. In some such cases, this can reduce the compute resources used to identify instances in an image. The reduced complexity can decrease the processing time to identify the instances and increase a vehicle's responsiveness. Moreover, this can enable a vehicle to more quickly and accurately identify objects in a scene and plan a route through the scene.

Figure 6A:
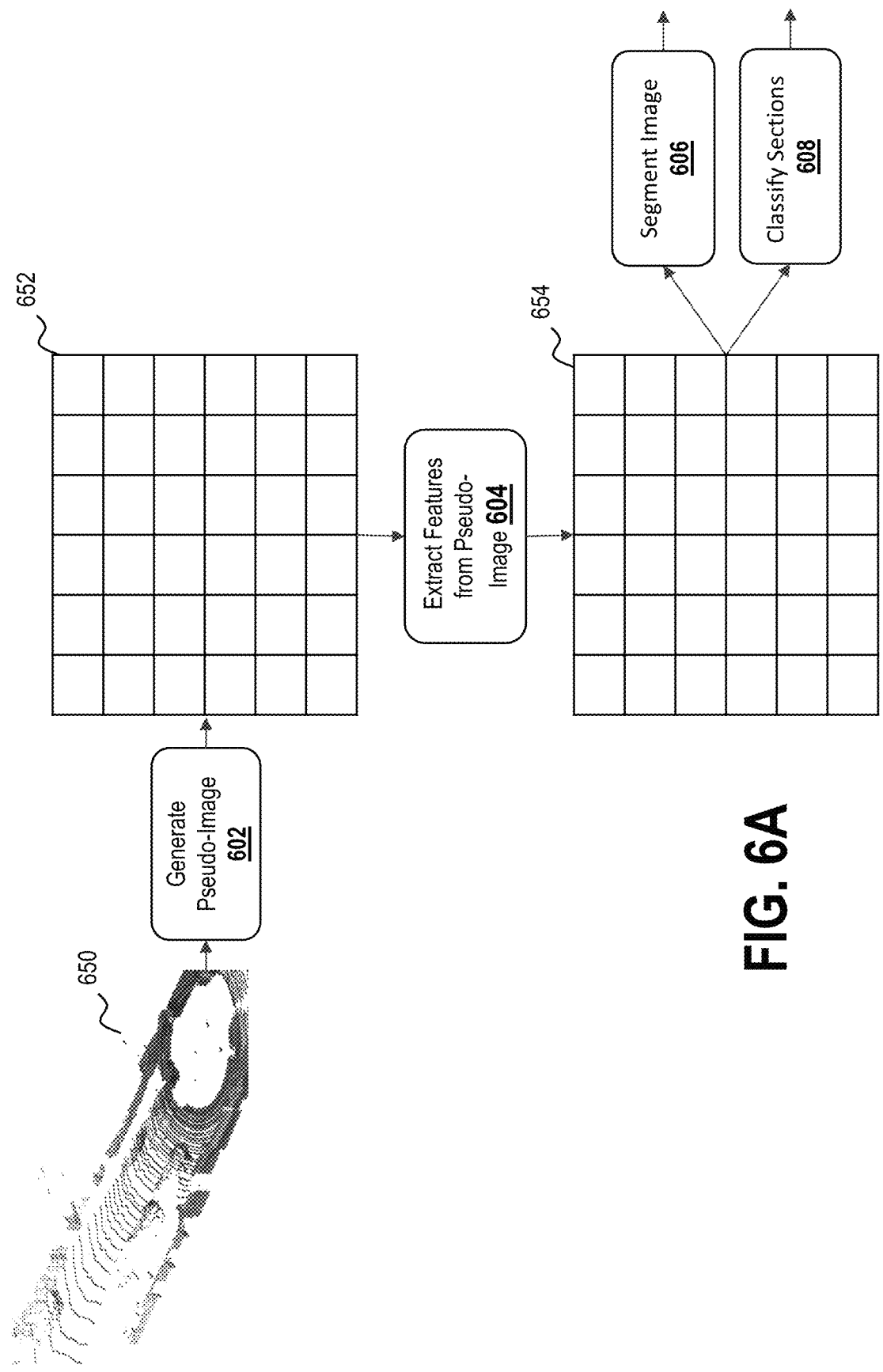
FIGS. 6A and 6B are operation diagrams illustrating an example operation of the perception system 402 to identify instances of agents in a pseudo-image.
Figure 6B:
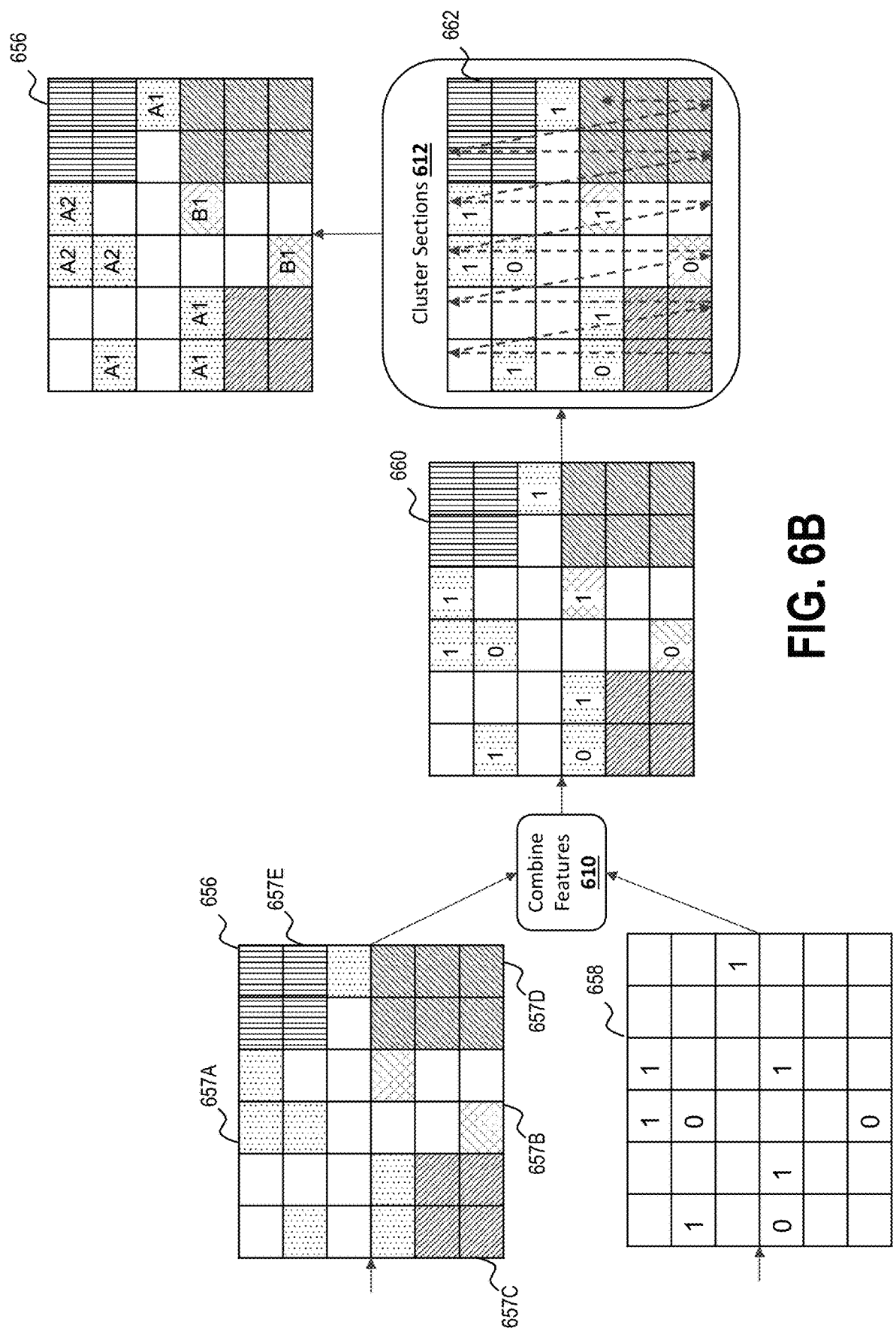

FIGS. 6A and 6B are operation diagrams illustrating an example operation of the perception system 402 to identify instances of agents in a pseudo-image.

At step 602, the pseudo-image system 504 uses 3D image data 650 to generate a pseudo-image 652. As described herein, the 3D image data 650 can correspond to lidar data, radar data, etc. In certain cases, the pseudo-image can be a bird-eye-view image. As described herein, the pseudo-image can be a 2D image that comprises a plurality of sections. In some cases, the sections can be pillars that extend from a ground plane in an upward direction. As described herein, the sections can include one or more data points associated with objects in a scene.

In certain cases, the pseudo-image system 504 can extract one or more learned features from the sections of the image. As described herein the extracted features can be learned features of the different sections of the image.

In the illustrated example, the pseudo-image 652 includes six columns of sections (or pillars) by six rows of sections (or pillars), however, it will be understood that the pseudo-image 652 can include fewer or more sections as desired. In some cases, each section can correspond to a particular location of a scene of the vehicle. As described herein, in some cases a section can correspond to a 20 cm×20 cm portion of a scene of a vehicle.

At step 604, the image feature extraction network 506 extracts one or more features from the pseudo-image 652. As described herein, the extracted features can be learned features of one or more objects within the pseudo-image. In this way, the image feature extraction network can provide an enriched pseudo-image. For example some or all of the data points within the pseudo-image can be further associated with the features extracted from the pseudo-image by the image feature extraction network 506. In some cases, the extracted features can be embedded with the data points and/or sections of the pseudo-image. Image 654 illustrates an example of an enriched pseudo-image.

At step 606, the semantic segmentation system 508 segments the sections of the pseudo-image into one or more object classifications. As described herein, the semantic segmentation system 508 can classify sections within the pseudo-image as any one or any combination of: barrier, bicycle, bus, car, construction vehicle, motorcycle, pedestrian, traffic cone, trailer, truck, driveable surface, other flat surface, sidewalk, terrain, manmade structure, vegetation. In some cases, one or more of the classifications can correspond to an agent (e.g., bicycle, bus, car, construction vehicle, motorcycle, pedestrian, trailer, truck) and other classifications can correspond to non-agents (e.g., barrier, traffic cone, driveable surface, other flat surface, sidewalk, terrain, manmade structure, vegetation). In some cases, the object classifications can be embedded in the pseudo-image with the different sections as illustrated by pseudo-image 656 (FIG. 6B), where the different patterns 657A, 657B, 657C, 657D, 657E indicate different object classifications for the respective sections. In the illustrated example, patterns 657A and 657B correspond to agent object classifications and patterns 657C, 657D, 657E correspond to non-agent object classifications.

At step 608, the instance portion segmentation system 510 classifies sections based on corresponding portions of instances. As described herein, the instance portion segmentation system 510 can classify sections of the pseudo-image based on portions of agent instances to which the sections are associated. For example, if a section corresponds to a primary portion of an instance of an agent, the instance portion segmentation system 510 can classify the section as a primary section. If the section does not correspond to a primary portion of an instance of an agent (or corresponds to a secondary portion), the instance portion segmentation system 510 can classify the section as a secondary section. In some cases, the instance portion segmentation system 510 may not classify a section. For example, the instance portion segmentation system 510 may not classify sections that are empty (or that have less than a threshold quantity of data points) and/or may not classify sections that do not correspond to an agent (e.g., sections that correspond to non-agent objects).

In some cases, the instance portion segmentation system 510 may classify sections by assigning an instance portion classification score. Pseudo-image 658 illustrates an example of a pseudo-image in which some sections have been assigned an instance portion classification score. In the illustrated example, the instance portion classification of '0' indicates a section classified as a primary section and instance portion classification of '1' indicates a section classified as a secondary section. As described herein, the instance portion segmentation system 510 can classify sections that correspond to agent objects and may ignore or not classify sections that correspond to non-agent objects and/or do not satisfy a threshold quantity of data points (e.g., empty sections).

At step 610, the instance identifier system 512 combines features from semantic segmentation system 508 and instance portion segmentation system 510. In some cases, the instance identifier system 512 combines features from the semantic segmentation system 508 and the instance portion segmentation system 510 by section such that object classifications (or other features) determined by the semantic segmentation system 508 are aggregated to instance portions classifications (or other features) determined by the instance portion segmentation system 510 for the same section. The pseudo-image 660 illustrates this by showing the class identification (e.g., patterns 657A-657E) aggregated with the instance portion classification scores for the relevant sections.

At step 612, the instance identifier system 512 clusters (or groups) sections associated with the same instance. As described herein, the instance identifier system 512 can traverse the pseudo-image in a predetermined pattern as shown by image 662. In the illustrated example, the instance identifier system 512 traverses the columns of the pseudo-image 662 in a zig-zag portion from left to right (moving from bottom to top of each column). As the instance identifier system 512 encounters instance portion classifications, it determines whether the instance portion classification corresponds to a new (unidentified) instance (e.g., '0') or an existing instance (e.g., '1'). In the illustrated example, by traversing the image 662 according to the predetermined pattern, the instance identifier system 512 can be confident that the left-most portion of an instance is the first portion encountered. As such, the instance identifier system 512 can effectively use the left-most portion of an instance of an object to distinguish between different instances. In this way, the instance identifier system 512 can reduce the computational complexity of grouping or clustering sections.

If the instance portion classification indicates a new (or unidentified) instance, the instance identifier system 512 generates a new (unique) instance identifier for the new (or unidentified) instance (e.g., A1, A2, B1). In some cases, the unique identifier can also indicate a class or type of the instance.

If the instance portion classification indicates association with an existing instance, the instance identifier system 512 identifies an existing instance to which the section can be associated and associates the section with the existing instance by assigning it the same instance identifier as other sections of that instance. In some cases, the instance identifier system 512 can identify an existing instance to which the section can be associated based on an object classification associated with the section and a distance threshold. For example, as described herein, the instance identifier system 512 can identify an existing instance that has the same object classification as the section under review and that satisfies a distance threshold (e.g., a section of the existing instance satisfies a distance threshold relative to the section under review).

Pseudo-image 656 illustrates an example result of clustering sections in which "A1" and "A2" indicate distinct instances of objects of the same type or classification (e.g., vehicles) as noted by a shared pattern 657A and "B1" indicates an instance of an object of a different type or classification (e.g., a pedestrian) as noted by a different pattern 657B. The sections with patterns 657C-657E can indicate sections that correspond to non-agent objects.

As described herein, the sections associated with the same instance of an object can share the same object classification and satisfy a distance threshold. Thus, even though the "B1" sections are not adjacent, the instance identifier system 512 can group them together.

Moreover, in the illustrated example, the instance identifier system 512 has identified a section on the right most column and left-most column as part of the same "A1" instance. As described herein, the instance identifier system 512 can determine that the right-most and left-most portions of the pseudo-image correspond to adjacent locations of the vehicle scene. Accordingly, the instance identifier system 512 can determine that those portions satisfy the distance threshold despite their location on the pseudo-image 656.

As the instance identifier system 512 traverses the pseudo-image 662 it can ignore sections that do not satisfy a threshold quantity of data points (e.g., empty sections) and/or sections associated with non-agents. In some cases, the instance identifier system 512 passively ignores these sections by clustering sections that have a instance portion classification and ignoring sections that do not have a instance portion classification.

Example Flow Diagram of Testing System

FIG. 7 is a flow diagram illustrating an example of a routine 700 implemented by one or more processors to segment instances of objects. The flow diagram illustrated in FIG. 7 is provided for illustrative purposes only. It will be understood that one or more of the steps of the routine illustrated in FIG. 7 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 702, the instance segmentation system 505 receives a pseudo-image. As described herein, the pseudo-image can be generated by a pseudo-image system 504 from a 3D image received from a 3D image sensor attached to a vehicle, such as but not limited to a lidar sensor, radar sensor, etc. The pseudo-image can include a 2D representation of the 3D image and can include multiple sections (or pillars). Some or all sections may include one or more data points that include spatial coordinates (e.g., x, y, z) and other information, such as but not limited to offsets, reflectance, time, distance from a particular point to a particular position within the pseudo-image section (e.g., center of the pseudo-image section), distance from a particular point to the image sensor that detected the point, etc. Each data point may include fewer or more dimensions or features as described herein.

At block 704, the instance segmentation system 505 determines an object classification for a section of the pseudo-image. As described herein, in some cases, the instance segmentation system 505 can use one or more neural networks associated with a semantic segmentation system 508 to classify objects within an image. In some cases, the objects can be classified as an agent (e.g., bicycle, bus, car, construction vehicle, motorcycle, pedestrian, trailer, truck) or non-agent (e.g., barrier, traffic cone, driveable surface, other flat surface, sidewalk, terrain, manmade structure, vegetation).

Pseudo-image sections that include a portion of an object can be assigned the same classification as the object. Accordingly, if a section includes a bicycle object, the section can be assigned the object classification: bicycle, etc. In some cases, the pseudo-image system 504 can generate the pseudo-image to avoid overlapping objects in a section. For example, the pseudo-image can be generated as a 2D birds-eye view to reduce or eliminate the likelihood that a section includes more than one type of object.

At block 706, the instance segmentation system 505 determines an instance portion classification for the section. As described herein, in certain cases, the segmentation system 505 can use one or more neural networks associated with an instance portion segmentation system 510 to classify portions of instances within an image. In certain cases, the instance segmentation system 505 (only) classifies portions of agent objects and may not classify non-agent objects, however, it will be understood that the instance segmentation system 505 can be configured in a variety of ways.

In some cases, the instance segmentation system 505 can classify portions of instances as a primary portion or a secondary portion. In certain cases, the instance segmentation system 505 can classify a portion of an instance as a primary portion of the instance if it corresponds to a particular (or predetermined) portion of the instance, such as but not limited to a left, right, top, or bottom-most portion of the instance, a location on a perimeter or edge of the instance, etc., as described herein. Similarly, the instance segmentation system 505 can classify a portion of an instance as a secondary portion of an instance if the portion corresponds to another portion of the instance (e.g., portions other than the primary portion). In certain cases, an instance may include a single primary portion, in which case, the remaining portions of the instance can be secondary portions. In some cases, an instance may include multiple primary portions, in which case, the secondary portions can include the portions other than the primary portions.

Pseudo-image sections that include a portion of an agent object can be assigned the same instance portion classification as the portion of the agent object. Accordingly, if a section includes a primary portion of an agent object, the instance segmentation system 505 can identify the section as a primary section. If a section includes a secondary portion of an agent object, the instance segmentation system 505 can identify the section as a secondary section.

At block 708, the instance segmentation system 505 groups the section with one or more other sections of the pseudo-image. As described herein, to group sections, the instance segmentation system 505 can traverse the image. In some cases, the instance segmentation system 505 traverses the pseudo-image in a predetermined pattern, such as bottom-to-top of a column and left-to-right. By traversing the image in a predetermined pattern, the instance segmentation system 505 can reduce the amount of compute resources used to identify instances.

In some cases, the instance segmentation system 505 can the section with other sections be based on an object classification of the section and/or the instance portion classification of the section. In certain cases, the instance segmentation system 505 can group the section to other sections with the same object classification. For example, if the section has an object classification of "vehicle," the instance segmentation system 505 can limit sections that can be grouped with the section under review to sections that also have a "vehicle" object classification.

In certain cases, the instance segmentation system 505 can group the section under review with other sections based on the instance portion classification of the section. For example, if the instance portion classification for the section identifies the section as a primary section, or the instance segmentation system 505 otherwise determines that the section corresponds to a new or unidentified instance, the instance segmentation system 505 can assign a new instance identifier to the section. As the instance segmentation system 505 continues traversing the pseudo-image and encounters secondary sections that have the same object classification as the section and satisfy a distance threshold, the instance segmentation system 505 can assign the secondary sections the same instance identifier.

As another example, if the instance portion classification for the section identifies the section as a secondary section or otherwise determines that the section corresponds to an existing instance, the instance segmentation system 505 can identify an existing instance that has the same object classification and that satisfies a threshold distance (e.g., includes a section that satisfies a threshold distance from the section under review). The instance segmentation system 505 can associate the instance identifier of the identified instance with section under review.

At block 710, the instance segmentation system 505 causes the vehicle to be operated based on the grouping. For example, the instance segmentation system 505 can communicate the grouping to another component of the perception system and/or to the planning system 404. Based on the grouping and identified instances of objects within a scene the planning system 404 can plan a route for the vehicle and control the vehicle using the control system 408.

It will be understood that fewer, more, or different blocks can be used in routine 700. Moreover, one or more blocks can be rearranged or performed concurrently or in parallel. In some cases, one or more blocks (e.g., blocks 704-708) of the routine 700 can be repeated multiple times for multiple sections of the pseudo-image until some or all of the instances of objects in an image are identified and classified. Accordingly, in some cases, the instance segmentation system 505 can identify multiple primary sections (as described herein) and multiple secondary sections (as described herein) within pseudo-image and then associate the secondary sections with one of the primary sections (e.g., based on object classification and distance). By grouping the secondary sections with the primary sections, the instance segmentation system 505 can identify multiple instances of objects. The autonomous vehicle compute 400 can use the identified instances of objects, etc., to control the vehicle.

As another example, in some cases, the routine 700 can include processing the pseudo-image with the grouped sections using one or more prediction systems and planning a route based on the output of the prediction systems.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

Various additional example embodiments of the disclosure can be described by the following clauses:

Clause 1. A method, comprising:
receiving, with at least one processor, a pseudo-image of a 3D image, wherein the 3D image is received from a 3D image sensor coupled to a vehicle, and wherein the pseudo-image comprises a plurality of sections;
determining, with the at least one processor, an object classification for a section of a plurality of sections of the pseudo-image;
determining, with the at least one processor, an instance portion classification for the section of the pseudo-image;
grouping the section with another section based at least in part on the object classification of the section and the instance portion classification for the section; and
operating the vehicle based at least in part on the grouping the section with the another section.

Clause 2. The method of clause 1, wherein the at least one section of the plurality of sections comprises a plurality of 3D data points.

Clause 3. The method of any of clauses 1 or 2, wherein the pseudo-image comprises a 2D representation of the 3D image.

Clause 4. The method of any of clauses 1-3, wherein determining an object classification for the at least one section comprises:
identifying at least a portion of an object in the section;
determining an object classification for the at least a portion of an object in the section; and
associating the object classification for the at least a portion of an object with the section.

Clause 5. The method of any of clauses 1-4, wherein the object classification for the at least one section comprises one of a vehicle, pedestrian, or bicycle.

Clause 6. The method of any of clauses 1-5, wherein determining an instance portion classification for the at least one section comprises:
identifying at least a portion of an instance of an agent object in the section;
determining an instance portion classification for the at least a portion of the agent object in the section; and
associating the instance portion classification for the at least a portion of the agent object in the section with the section.

Clause 7. The method of clause 6, wherein the instance portion classification for the at least one section indicates that the section is one of a primary section of the instance of the agent object or a secondary section of the instance of the agent object.

Clause 8. The method of clause 6, wherein determining an instance portion classification for the at least one section comprises identifying the section as a primary section of the instance of the agent object based on a determination that the section includes a predetermined portion of the instance of the agent object.

Clause 9. The method of clause 8, wherein the predetermined portion if the instance of the agent object is a left-most portion of the instance of the agent object.

Clause 10. The method of clause 6, wherein determining an instance portion classification for the at least one section comprises: identifying the section as a secondary section of the instance of the agent object based on a determination that the section does not include a predetermined portion of the instance of the agent object.

Clause 11. The method of any of clauses 1-7, wherein grouping the at least one section with another section comprises:
  traversing the pseudo-image in a predetermined pattern;
  determining that the instance portion classification for the at least one section indicates that the at least one section corresponds to an unidentified instance;
  based on the determining that the instance portion classification for the at least one section corresponds to an unidentified instance, generating an instance identifier;
  associating the instance identifier with the at least one section;
  traversing the pseudo-image in the predetermined pattern;
  determining that a instance portion classification for the another section corresponds to an existing instance;
  determining that the object classification for the at least one section and an object classification for the another section match;
  determining that a distance between the at least one section and the another section satisfies a threshold distance; and
  associating the generated instance identifier with the another section.

Clause 12. The method of any of clauses 1-7, wherein grouping the at least one section with another section comprises:
  traversing the pseudo-image in a predetermined pattern;
  determining that the instance portion classification for the at least one section corresponds to an existing instance; and
  based on the determining that the instance portion classification for the at least one section corresponds to an existing instance:
    identifying a previously traversed section of the pseudo-image,
    determining that the object classification for the at least one section and an object classification for the previously traversed section match,
    determining that a distance between the at least one section and the previously traversed section satisfies a threshold distance, and
    associating an instance identifier associated with the previously traversed section with the at least one section.

Clause 13. The method of any of clauses 1-7, 11 or 12, wherein the instance portion classification is binary.

Clause 14. A system, comprising:
at least one processor, and
at least one non-transitory storage media storing instructions that, when executed by the at least one processor, cause the at least one processor to:
  receive a pseudo-image of a 3D image, wherein the 3D image is received from a 3D image sensor coupled to a vehicle, and wherein the pseudo-image comprises a plurality of sections;
  determine an object classification for a section of a plurality of sections of the pseudo-image;
  determine an instance portion classification for the section of the pseudo-image;
  group the section with another section based at least in part on the object classification of the section and the instance portion classification for the section; and
  cause the vehicle to be operated based at least in part on the grouping the section with the another section.

Clause 15. The system of clause 14, wherein to group the at least one section with another section, the instructions cause the at least one processor to:
  traverse the pseudo-image in a predetermined pattern;
  determine that the instance portion classification for the at least one section indicates that the at least one section corresponds to an unidentified instance;
  based on a determination that the instance portion classification for the at least one section corresponds to an unidentified instance, generate an instance identifier;
  associate the instance identifier with the at least one section;
  traverse the pseudo-image in the predetermined pattern;
  determine that a instance portion classification for the another section corresponds to an existing instance;
  determine that the object classification for the at least one section and an object classification for the another section match;
  determine that a distance between the at least one section and the another section satisfies a threshold distance; and
  associate the generated instance identifier with the another section.

Clause 16. The system of clause 14, wherein to group the at least one section with another section, the instructions cause the at least one processor to:
  traverse the pseudo-image in a predetermined pattern;
  determine that the instance portion classification for the at least one section corresponds to an existing instance; and
  based on a determination that the instance portion classification for the at least one section corresponds to an existing instance:
    identify a previously traversed section of the pseudo-image,
    determine that the object classification for the at least one section and an object classification for the previously traversed section match,
    determine that a distance between the at least one section and the previously traversed section satisfies a threshold distance, and
    associate an instance identifier associated with the previously traversed section with the at least one section.

Clause 17. The system of any of clauses 14-16, wherein to determine an instance portion classification for the at least one section, the instructions cause the at least one processor to:

identify at least a portion of an instance of an agent object in the section;
determine an instance portion classification for the at least a portion of the agent object in the section; and
associate the instance portion classification for the at least a portion of the agent object in the section with the section.

Clause 18. At least one non-transitory storage media storing instructions that, when executed by at least one processor, cause the at least one processor to:
receive a pseudo-image of a 3D image, wherein the 3D image is received from a 3D image sensor coupled to a vehicle, and wherein the pseudo-image comprises a plurality of sections;
determine an object classification for a section of a plurality of sections of the pseudo-image;
determine an instance portion classification for the section of the pseudo-image;
group the section with another section based at least in part on the object classification of the section and the instance portion classification for the section; and
cause the vehicle to be operated based at least in part on the grouping the section with the another section.

Clause 19. The at least one non-transitory storage media of clause 18, wherein to group the at least one section with another section, the instructions cause the at least one processor to:
traverse the pseudo-image in a predetermined pattern;
determine that the instance portion classification for the at least one section indicates that the at least one section corresponds to an unidentified instance;
based on a determination that the instance portion classification for the at least one section corresponds to an unidentified instance, generate an instance identifier;
associate the instance identifier with the at least one section;
traverse the pseudo-image in the predetermined pattern;
determine that a instance portion classification for the another section corresponds to an existing instance;
determine that the object classification for the at least one section and an object classification for the another section match;
determine that a distance between the at least one section and the another section satisfies a threshold distance; and
associate the generated instance identifier with the another section.

Clause 20. The at least one non-transitory storage media of clause 18, wherein to group the at least one section with another section, the instructions cause the at least one processor to:
traverse the pseudo-image in a predetermined pattern;
determine that the instance portion classification for the at least one section corresponds to an existing instance; and
based on a determination that the instance portion classification for the at least one section corresponds to an existing instance:
identify a previously traversed section of the pseudo-image,
determine that the object classification for the at least one section and an object classification for the previously traversed section match,
determine that a distance between the at least one section and the previously traversed section satisfies a threshold distance, and
associate an instance identifier associated with the previously traversed section with the at least one section.

What is claimed is:

1. A method, comprising:
receiving, with at least one processor, a pseudo-image of a 3D image of an environment, wherein the 3D image is received from a 3D image sensor coupled to a vehicle, and wherein the pseudo-image comprises a grid of sections;
concurrently determining, with the at least one processor;
an object classification for a a plurality of sections of the pseudo-image using a first neural network, and
an instance portion classification for the plurality of sections of the pseudo-image using a second neural network;
combining, for each section of the plurality of sections, the object classification for the section and the instance portion classification for the section to form combined features for the section;
grouping a first section of the plurality of sections with a second section of the plurality of sections using the combined features of the first section and the combined features of the second section;
identifying a particular instance of an object in the environment using the grouped first section and second section; and
causing the vehicle to navigate based at least in part on the identified instances.

2. The method of claim 1, wherein the at least one-first section of the plurality of sections comprises a plurality of 3D data points.

3. The method of claim 1, wherein the pseudo-image comprises a 2D representation of the 3D image.

4. The method of claim 1, wherein determining the object classification for the first section comprises:
identifying at least a portion of an object in the first section;
determining an object classification for the at least a portion of an object in the first section; and
associating the object classification for the at least a portion of an object with the first section as the object classification for the first section.

5. The method of claim 1, wherein the object classification for the first section comprises one of a vehicle, pedestrian, or bicycle.

6. The method of claim 1, wherein determining an instance portion classification for the plurality of sections comprises:
identifying a first portion of an instance of an agent object in the first section;
determining a first instance portion classification for the first portion of the agent object in the first section;
associating the first instance portion classification for the first portion of the agent object with the first section;
identifying a second portion of the instance of the agent object in the second section;
determining a second instance portion classification for the second portion of the agent object in the second section; and
associating the second instance portion classification for the second portion of the agent object with the second section.

7. The method of claim 6, wherein the first instance portion classification for the first section indicates that the first section is a predetermined portion of the instance of the agent object and the second instance portion classification for the second section indicates that the second section is another portion of the instance of the agent object other than the predetermined portion.

8. The method of claim 7, wherein the predetermined portion of the instance of the agent object is a left-most portion of the instance of the agent object.

9. The method of claim 1, wherein grouping the first section with the second section comprises:
traversing the pseudo-image in a predetermined pattern;
determining that the instance portion classification for the first section indicates that the first section corresponds to an unidentified instance;
based on the determining that the instance portion classification for the first section corresponds to an unidentified instance, generating an instance identifier;
associating the generated instance identifier with the first section;
determining that an instance portion classification for the another-second section corresponds to an existing instance;
determining that the object classification for the first section and the object classification for the second section match;
determining that a distance between the first section and the second section satisfies a threshold distance; and
associating the generated instance identifier with the second section.

10. The method of claim 1, further comprising:
traversing the pseudo-image in a predetermined pattern;
determining that the instance portion classification for the first section corresponds to an existing instance; and
based on the determining that the instance portion classification for the first section corresponds to an existing instance:
identifying a previously traversed section of the pseudo-image,
determining that the object classification for the first section and an object classification for the previously traversed section match,
determining that a distance between the first section and the previously traversed section satisfies a threshold distance, and
associating an instance identifier associated with the previously traversed section with the first section.

11. The method of claim 1, wherein the instance portion classification is binary.

12. A system, comprising:
at least one processor, and
at least one non-transitory storage media storing instructions that, when executed by the at least one processor, cause the at least one processor to:
receive a pseudo-image of a 3D image of an environment, wherein the 3D image is received from a 3D image sensor coupled to a vehicle, and wherein the pseudo-image comprises a grid of sections;
concurrently determine an object classification for a plurality of sections of the pseudo-image using a first neural network and an instance portion classification for the plurality of sections of the pseudo-image using a second neural network;
combine, for each section of the plurality of sections, the object classification for the section and the instance portion classification for the section to form combined features for the section;
group a first section of the plurality of sections with a second section of the plurality of sections using the combined features of the first section and the combined features of the second section;
identify a particular instance of an object in the environment using the grouped first section and second section; and
cause the vehicle to be operated based at least in part on the identified instances.

13. The system of claim 12, wherein to group the first section with the second section, the instructions cause the at least one processor to:
traverse the pseudo-image in a predetermined pattern;
determine that the instance portion classification for the first section indicates that the first section corresponds to an unidentified instance;
based on a determination that the instance portion classification for the first section corresponds to an unidentified instance, generate an instance identifier;
associate the generated instance identifier with the first section;
determine that an instance portion classification for the second section corresponds to an existing instance;
determine that the object classification for the first section and the object classification for the second section match;
determine that a distance between the first section and the second section satisfies a threshold distance; and
associate the generated instance identifier with the second section.

14. The system of claim 12, wherein the instructions further cause the first processor to:
traverse the pseudo-image in a predetermined pattern;
determine that the instance portion classification for the first section corresponds to an existing instance; and
based on a determination that the instance portion classification for the first section corresponds to an existing instance:
identify a previously traversed section of the pseudo-image,
determine that the object classification for the first section and an object classification for the previously traversed section match,
determine that a distance between the first section and the previously traversed section satisfies a threshold distance, and
associate an instance identifier associated with the previously traversed section with the first section.

15. The system of claim 12, wherein to determine an instance portion classification for the plurality of sections, the instructions cause the at least one processor to:
identify a first portion of an instance of an agent object in the first section;
determine a first instance portion classification for the first portion of the agent object in the first section;
associate the first instance portion classification for the first portion of the agent object with the first section;
identify a second portion of the instance of the agent object in the second section;
determine a second instance portion classification for the second portion of the agent object in the second section; and
associate the second instance portion classification for the second portion of the agent object with the second section.

16. At least one non-transitory storage media storing instructions that, when executed by at least one processor, cause the at least one processor to:

receive a pseudo-image of a 3D image of an environment, wherein the 3D image is received from a 3D image sensor coupled to a vehicle, and wherein the pseudo-image comprises a grid of sections;

concurrently determine an object classification for a plurality of sections of the pseudo-image using a first neural network and an instance portion classification for the plurality of sections of the pseudo-image using a second neural network;

combine, for each section of the plurality of sections, the object classification for the section and the instance portion classification for the section to form combined features for the section;

group a first section of the plurality of sections with a second section of the plurality of sections using the combined features of the first section and the combined features of the second section;

identify a particular instance of an object in the environment using the grouped first section and second section; and cause the vehicle to be operated based at least in part on the identified instances.

17. The at least one non-transitory storage media of claim 16, wherein to group the first section with the second section, the instructions cause the first processor to:

traverse the pseudo-image in a predetermined pattern;

determine that the instance portion classification for the first section indicates that the first section corresponds to an unidentified instance;

based on a determination that the instance portion classification for the first section corresponds to an unidentified instance, generate an instance identifier;

associate the generated instance identifier with the first section;

traverse the pseudo-image in the predetermined pattern;

determine that an instance portion classification for the second section corresponds to an existing instance;

determine that the object classification for the first section and the object classification for the second section match;

determine that a distance between the first section and the second section satisfies a threshold distance; and associate the generated instance identifier with the second section.

18. The at least one non-transitory storage media of claim 16, wherein the instructions further cause the at least one processor to:

traverse the pseudo-image in a predetermined pattern;

determine that the instance portion classification for the first section corresponds to an existing instance; and based on a determination that the instance portion classification for the first section corresponds to an existing instance:

identify a previously traversed section of the pseudo-image, determine that the object classification for the first section and an object classification for the previously traversed section match, determine that a distance between the first section and the previously traversed section satisfies a threshold distance, and associate an instance identifier associated with the previously traversed section with the first section.

* * * * *

UNITED STATES PATENT AND TRADEMARK OFFICE
CERTIFICATE OF CORRECTION

| | | |
|---|---|---|
| PATENT NO. | : 12,437,551 B2 | Page 1 of 1 |
| APPLICATION NO. | : 17/657590 | |
| DATED | : October 7, 2025 | |
| INVENTOR(S) | : Sourabh Vora et al. | |

It is certified that error appears in the above-identified patent and that said Letters Patent is hereby corrected as shown below:

In the Specification

Column 8, Line 18, delete "predetermined spectrum In" and insert -- predetermined spectrum. In --.

Column 11, Line 14, delete "a WiFi® interface," and insert -- a Wi-Fi® interface, --.

In the Claims

Column 40, Claim 1, Line 11, delete "one processor;" and insert -- one processor: --.

Column 40, Claim 1, Line 12, delete "for a a plurality" and insert -- for a plurality --.

Column 40, Claim 2, Line 30, delete "the at least one-first section" and insert -- the first section --.

Column 41, Claim 9, Line 20, delete "the another-second section" and insert -- the second section --.

Signed and Sealed this
Ninth Day of December, 2025

John A. Squires
*Director of the United States Patent and Trademark Office*